(12) United States Patent
Bloch et al.

(10) Patent No.: US 11,601,721 B2
(45) Date of Patent: Mar. 7, 2023

(54) INTERACTIVE VIDEO DYNAMIC ADAPTATION AND USER PROFILING

(71) Applicant: JBF Interlude 2009 LTD, Tel Aviv-Jaffa (IL)

(72) Inventors: Jonathan Bloch, Brooklyn, NY (US); Barak Feldman, Tenafly, NJ (US); Tal Zubalsky, Brooklyn, NY (US); Yuval Hofshy, Kfar Saba (IL); Itay Sasson, Tel-Aviv (IL)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

(21) Appl. No.: 15/997,284

(22) Filed: Jun. 4, 2018

(65) Prior Publication Data
US 2019/0373330 A1 Dec. 5, 2019

(51) Int. Cl.
*H04N 21/472* (2011.01)
*H04N 21/475* (2011.01)
*H04N 21/45* (2011.01)
*H04N 21/81* (2011.01)
*H04N 21/482* (2011.01)
*H04N 21/442* (2011.01)

(52) U.S. Cl.
CPC . *H04N 21/47217* (2013.01); *H04N 21/44226* (2020.08); *H04N 21/4532* (2013.01); *H04N 21/4755* (2013.01); *H04N 21/482* (2013.01); *H04N 21/812* (2013.01); *H04N 21/816* (2013.01)

(58) Field of Classification Search
None
See application file for complete search history.

(56) References Cited

U.S. PATENT DOCUMENTS

| 4,569,026 A | 2/1986 | Best |
| 5,137,277 A | 8/1992 | Kitaue |

(Continued)

FOREIGN PATENT DOCUMENTS

| CA | 2639491 A1 | 3/2010 |
| DE | 2428329 A1 | 1/1975 |

(Continued)

OTHER PUBLICATIONS

An ffmpeg and SDL Tutorial, "Tutorial 05: Synching Video," Retrieved from Internet on Mar. 15, 2013: <http://dranger.com/ffmpeg/tutorial05.html>, (4 pages).

(Continued)

*Primary Examiner* — An Son P Huynh
(74) *Attorney, Agent, or Firm* — Goodwin Procter LLP

(57) ABSTRACT

The presentation of an interactive video is dynamically modified based on a user profile. A first interactive video can be represented by a first video tree defining multiple branches in the first interactive video, with each branch having one or more video segments. Information is tracked including (i) the content of video segments played during presentation of the first interactive video and/or (ii) decisions of a user made during the presentation of the first interactive video. A user profile having measured attributes is generated based on the tracked information. The profile can then be used in dynamically modifying the presentation of a second interactive video.

19 Claims, 7 Drawing Sheets

(56) References Cited

U.S. PATENT DOCUMENTS

| | | |
|---|---|---|
| 5,161,034 A | 11/1992 | Klappert |
| 5,568,602 A | 10/1996 | Callahan et al. |
| 5,568,603 A | 10/1996 | Chen et al. |
| 5,597,312 A | 1/1997 | Bloom et al. |
| 5,607,356 A | 3/1997 | Schwartz |
| 5,610,653 A * | 3/1997 | Abecassis ............... A63F 13/10 |
| | | 348/170 |
| 5,636,036 A | 6/1997 | Ashbey |
| 5,676,551 A | 10/1997 | Knight et al. |
| 5,694,163 A | 12/1997 | Harrison |
| 5,715,169 A | 2/1998 | Noguchi |
| 5,734,862 A | 3/1998 | Kulas |
| 5,737,527 A | 4/1998 | Shiels et al. |
| 5,745,738 A | 4/1998 | Ricard |
| 5,751,953 A | 5/1998 | Shiels et al. |
| 5,754,770 A | 5/1998 | Shiels et al. |
| 5,818,435 A | 10/1998 | Kozuka et al. |
| 5,848,934 A | 12/1998 | Shiels et al. |
| 5,887,110 A | 3/1999 | Sakamoto et al. |
| 5,894,320 A | 4/1999 | Vancelette |
| 5,956,037 A * | 9/1999 | Osawa ................... G09B 5/065 |
| | | 345/418 |
| 5,966,121 A | 10/1999 | Hubbell et al. |
| 5,983,190 A | 11/1999 | Trower, II et al. |
| 6,067,400 A | 5/2000 | Saeki et al. |
| 6,091,886 A * | 7/2000 | Abecassis ............... G11B 27/34 |
| | | 348/E7.071 |
| 6,122,668 A | 9/2000 | Teng et al. |
| 6,128,712 A | 10/2000 | Hunt et al. |
| 6,191,780 B1 | 2/2001 | Martin et al. |
| 6,222,925 B1 | 4/2001 | Shiels et al. |
| 6,240,555 B1 | 5/2001 | Shoff et al. |
| 6,298,020 B1 | 10/2001 | Kumagami |
| 6,298,482 B1 | 10/2001 | Seidman et al. |
| 6,460,036 B1 * | 10/2002 | Herz ...................... G06Q 30/02 |
| | | 707/748 |
| 6,535,639 B1 | 3/2003 | Uchihachi et al. |
| 6,657,906 B2 | 12/2003 | Martin |
| 6,698,020 B1 | 2/2004 | Zigmond et al. |
| 6,728,477 B1 | 4/2004 | Watkins |
| 6,771,875 B1 | 8/2004 | Kunieda et al. |
| 6,801,947 B1 | 10/2004 | Li |
| 6,947,966 B1 | 9/2005 | Oko, Jr. et al. |
| 7,085,844 B2 * | 8/2006 | Thompson ........... G11B 27/105 |
| | | 386/E5.024 |
| 7,155,676 B2 | 12/2006 | Land et al. |
| 7,231,132 B1 | 6/2007 | Davenport |
| 7,296,231 B2 | 11/2007 | Loui et al. |
| 7,310,784 B1 | 12/2007 | Gottlieb et al. |
| 7,319,780 B2 * | 1/2008 | Fedorovskaya ........ G16H 30/20 |
| | | 382/128 |
| 7,379,653 B2 | 5/2008 | Yap et al. |
| 7,430,360 B2 | 9/2008 | Abecassis |
| 7,444,069 B1 | 10/2008 | Bernsley |
| 7,472,910 B1 | 1/2009 | Okada et al. |
| 7,627,605 B1 | 12/2009 | Lamere et al. |
| 7,650,623 B2 | 1/2010 | Hudgeons et al. |
| 7,669,128 B2 | 2/2010 | Bailey et al. |
| 7,694,320 B1 | 4/2010 | Yeo et al. |
| 7,779,438 B2 | 8/2010 | Davies |
| 7,787,973 B2 | 8/2010 | Lambert |
| 7,917,505 B2 | 3/2011 | van Gent et al. |
| 8,024,762 B2 | 9/2011 | Britt |
| 8,046,801 B2 * | 10/2011 | Ellis ....................... H04N 7/163 |
| | | 725/58 |
| 8,065,710 B2 | 11/2011 | Malik |
| 8,151,139 B1 | 4/2012 | Gordon |
| 8,176,425 B2 | 5/2012 | Wallace et al. |
| 8,190,001 B2 | 5/2012 | Bernsley |
| 8,202,167 B2 | 6/2012 | Ackley et al. |
| 8,276,058 B2 | 9/2012 | Gottlieb et al. |
| 8,281,355 B1 | 10/2012 | Weaver et al. |
| 8,321,905 B1 | 11/2012 | Streeter et al. |
| 8,341,662 B1 | 12/2012 | Bassett et al. |
| 8,350,908 B2 | 1/2013 | Morris et al. |
| 8,405,706 B2 | 3/2013 | Zhang et al. |
| 8,600,220 B2 | 12/2013 | Bloch et al. |
| 8,612,517 B1 | 12/2013 | Yadid et al. |
| 8,626,337 B2 | 1/2014 | Corak et al. |
| 8,646,020 B2 | 2/2014 | Reisman |
| 8,650,489 B1 | 2/2014 | Baum et al. |
| 8,667,395 B2 | 3/2014 | Hosogai et al. |
| 8,750,682 B1 | 6/2014 | Nicksay et al. |
| 8,752,087 B2 | 6/2014 | Begeja et al. |
| 8,826,337 B2 | 9/2014 | Issa et al. |
| 8,860,882 B2 | 10/2014 | Bloch et al. |
| 8,930,975 B2 * | 1/2015 | Woods ................. H04N 21/488 |
| | | 725/10 |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,082,092 B1 | 7/2015 | Henry |
| 9,094,718 B2 | 7/2015 | Barton et al. |
| 9,190,110 B2 | 11/2015 | Bloch |
| 9,257,148 B2 | 2/2016 | Bloch et al. |
| 9,268,774 B2 | 2/2016 | Kim et al. |
| 9,271,015 B2 | 2/2016 | Bloch et al. |
| 9,363,464 B2 * | 6/2016 | Alexander ............. H04N 5/775 |
| 9,367,196 B1 | 6/2016 | Goldstein et al. |
| 9,374,411 B1 * | 6/2016 | Goetz ................... H04L 67/125 |
| 9,390,099 B1 | 7/2016 | Wang et al. |
| 9,456,247 B1 | 9/2016 | Pontual et al. |
| 9,465,435 B1 | 10/2016 | Zhang et al. |
| 9,473,582 B1 | 10/2016 | Fraccaroli |
| 9,497,496 B1 | 11/2016 | Corley et al. |
| 9,510,044 B1 | 11/2016 | Pereira et al. |
| 9,520,155 B2 | 12/2016 | Bloch et al. |
| 9,530,454 B2 | 12/2016 | Bloch et al. |
| 9,531,998 B1 * | 12/2016 | Farrell ..................... G10L 15/02 |
| 9,538,219 B2 * | 1/2017 | Sakata ................... H04N 17/04 |
| 9,554,061 B1 | 1/2017 | Proctor, Jr. et al. |
| 9,571,877 B2 * | 2/2017 | Lee ......................... G06Q 30/02 |
| 9,607,655 B2 | 3/2017 | Bloch et al. |
| 9,641,898 B2 | 5/2017 | Bloch et al. |
| 9,653,115 B2 | 5/2017 | Bloch et al. |
| 9,653,116 B2 | 5/2017 | Paulraj et al. |
| 9,672,868 B2 | 6/2017 | Bloch et al. |
| 9,715,901 B1 | 7/2017 | Singh et al. |
| 9,736,503 B1 * | 8/2017 | Bakshi ............... H04N 21/23424 |
| 9,792,026 B2 | 10/2017 | Bloch et al. |
| 9,792,957 B2 | 10/2017 | Bloch et al. |
| 9,826,285 B1 | 11/2017 | Mishra et al. |
| 9,967,621 B2 | 5/2018 | Armstrong et al. |
| 10,070,192 B2 * | 9/2018 | Baratz ................... H04N 21/222 |
| 10,178,304 B1 | 1/2019 | Tudor et al. |
| 10,178,421 B2 * | 1/2019 | Thomas ............. H04N 21/2543 |
| 10,187,687 B2 * | 1/2019 | Harb ................... H04N 21/4122 |
| 10,194,189 B1 * | 1/2019 | Goetz ................. H04N 21/4122 |
| 10,257,572 B2 * | 4/2019 | Manus .................... G06N 20/00 |
| 10,257,578 B1 | 4/2019 | Bloch et al. |
| 10,310,697 B2 | 6/2019 | Roberts et al. |
| 10,419,790 B2 * | 9/2019 | Gersten ................ H04N 21/454 |
| 10,460,765 B2 | 10/2019 | Bloch et al. |
| 10,523,982 B2 | 12/2019 | Oyman |
| 10,771,824 B1 | 9/2020 | Haritaoglu et al. |
| 10,856,049 B2 | 12/2020 | Bloch et al. |
| 11,003,748 B2 | 5/2021 | Oliker et al. |
| 2001/0056427 A1 | 12/2001 | Yoon et al. |
| 2002/0019799 A1 | 2/2002 | Ginsberg et al. |
| 2002/0029218 A1 | 3/2002 | Bentley et al. |
| 2002/0053089 A1 | 5/2002 | Massey |
| 2002/0086724 A1 | 7/2002 | Miyaki et al. |
| 2002/0089523 A1 | 7/2002 | Hodgkinson |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0120931 A1 * | 8/2002 | Huber ............... H04N 21/25891 |
| | | 725/34 |
| 2002/0124250 A1 | 9/2002 | Proehl et al. |
| 2002/0129374 A1 | 9/2002 | Freeman et al. |
| 2002/0140719 A1 | 10/2002 | Amir et al. |
| 2002/0144262 A1 | 10/2002 | Plotnick et al. |

(56) References Cited

U.S. PATENT DOCUMENTS

| | | |
|---|---|---|
| 2002/0174430 A1* | 11/2002 | Ellis .................. G11B 27/005 725/46 |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1* | 1/2003 | Ellis .................. H04N 21/2665 715/723 |
| 2003/0023757 A1 | 1/2003 | Ishioka et al. |
| 2003/0039471 A1 | 2/2003 | Hashimoto |
| 2003/0069057 A1 | 4/2003 | DeFrees-Parrott |
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Safer et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1 | 2/2004 | Hughes |
| 2004/0070595 A1 | 4/2004 | Atlas et al. |
| 2004/0091848 A1 | 5/2004 | Nemitz |
| 2004/0125124 A1 | 7/2004 | Kim et al. |
| 2004/0128317 A1 | 7/2004 | Sull et al. |
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 | 12/2004 | Freeman et al. |
| 2005/0019015 A1 | 1/2005 | Ackley et al. |
| 2005/0028193 A1 | 2/2005 | Candelore et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1 | 5/2005 | Sato |
| 2005/0120389 A1 | 6/2005 | Boss et al. |
| 2005/0132401 A1* | 6/2005 | Boccon-Gibod .... G11B 27/002 725/34 |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0240955 A1 | 10/2005 | Hudson |
| 2005/0251820 A1 | 11/2005 | Stefanik et al. |
| 2005/0251827 A1* | 11/2005 | Ellis .................. H04N 5/44543 725/47 |
| 2005/0289582 A1* | 12/2005 | Tavares .................. H04H 60/33 725/10 |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0080167 A1 | 4/2006 | Chen et al. |
| 2006/0089843 A1 | 4/2006 | Flather |
| 2006/0120624 A1* | 6/2006 | Jojic .................. G06F 16/739 382/284 |
| 2006/0130121 A1 | 6/2006 | Candelore et al. |
| 2006/0150072 A1 | 7/2006 | Salvucci |
| 2006/0150216 A1* | 7/2006 | Herz .................. G06Q 20/383 725/50 |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0212904 A1 | 9/2006 | Klarfeld et al. |
| 2006/0222322 A1 | 10/2006 | Levitan |
| 2006/0224260 A1 | 10/2006 | Hicken et al. |
| 2006/0253330 A1 | 11/2006 | Maggio et al. |
| 2006/0274828 A1 | 12/2006 | Siemens et al. |
| 2007/0003149 A1 | 1/2007 | Nagumo et al. |
| 2007/0018980 A1 | 1/2007 | Berteig et al. |
| 2007/0024706 A1 | 2/2007 | Brannon et al. |
| 2007/0028272 A1 | 2/2007 | Lockton |
| 2007/0033633 A1 | 2/2007 | Andrews et al. |
| 2007/0055989 A1 | 3/2007 | Shanks et al. |
| 2007/0079325 A1* | 4/2007 | de Heer .............. H04N 7/17318 725/32 |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1* | 7/2007 | Cordray .............. H04N 5/44543 386/230 |
| 2007/0157234 A1* | 7/2007 | Walker .............. H04N 5/44543 725/38 |
| 2007/0157260 A1* | 7/2007 | Walker .................. H04N 7/163 725/86 |
| 2007/0157261 A1 | 7/2007 | Steelberg et al. |
| 2007/0162395 A1 | 7/2007 | Ben-Yaacov et al. |
| 2007/0180488 A1 | 8/2007 | Walter et al. |
| 2007/0220583 A1* | 9/2007 | Bailey .................. G11B 27/034 725/135 |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0001956 A1 | 1/2008 | Markovic et al. |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0139301 A1 | 6/2008 | Holthe |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0238938 A1 | 10/2008 | Eklund et al. |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0027337 A1* | 1/2009 | Hildreth .............. G06F 3/0482 345/158 |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0063995 A1* | 3/2009 | Baron .............. H04N 21/25866 715/753 |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0131764 A1* | 5/2009 | Lee .................. A61B 5/6803 600/301 |
| 2009/0133051 A1* | 5/2009 | Hildreth .............. H04N 21/4223 725/28 |
| 2009/0133071 A1 | 5/2009 | Sakai et al. |
| 2009/0138805 A1* | 5/2009 | Hildreth .......... H04N 21/64322 715/745 |
| 2009/0177538 A1 | 7/2009 | Brewer et al. |
| 2009/0178089 A1 | 7/2009 | Picco et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0210790 A1 | 8/2009 | Thomas |
| 2009/0226046 A1* | 9/2009 | Shteyn .............. G06K 9/00711 382/118 |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265737 A1 | 10/2009 | Issa et al. |

(56) References Cited

U.S. PATENT DOCUMENTS

| | | |
|---|---|---|
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1* | 3/2010 | Amento ............... H04H 60/33 725/10 |
| 2010/0077290 A1 | 3/2010 | Pueyo |
| 2010/0088726 A1 | 4/2010 | Curtis et al. |
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1* | 6/2010 | Yates ................. G06F 3/0482 715/841 |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1* | 9/2010 | Amento ............... G11B 27/034 725/38 |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0312670 A1 | 12/2010 | Dempsey |
| 2010/0325135 A1* | 12/2010 | Chen ................... G10H 1/0008 707/759 |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0060993 A1 | 3/2011 | Cotter et al. |
| 2011/0069940 A1* | 3/2011 | Shimy ................. G11B 27/105 386/296 |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0125512 A1 | 5/2011 | Huang |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1* | 7/2011 | Fithian ................. G06Q 10/00 340/5.52 |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1* | 8/2011 | Bloch ................. G11B 27/034 375/240.25 |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0293240 A1 | 12/2011 | Newton et al. |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0062576 A1 | 3/2012 | Rosenthal et al. |
| 2012/0072420 A1* | 3/2012 | Moganti ............. G06F 16/748 707/737 |
| 2012/0081389 A1 | 4/2012 | Dilts |
| 2012/0089911 A1 | 4/2012 | Hosking et al. |
| 2012/0090000 A1* | 4/2012 | Cohen ............... H04N 21/8355 725/32 |
| 2012/0094768 A1 | 4/2012 | McCaddon et al. |
| 2012/0105723 A1* | 5/2012 | van Coppenolle .. H04N 21/812 348/564 |
| 2012/0110618 A1 | 5/2012 | Kilar et al. |
| 2012/0110620 A1 | 5/2012 | Kilar et al. |
| 2012/0117145 A1 | 5/2012 | Clift et al. |
| 2012/0120114 A1 | 5/2012 | You et al. |
| 2012/0134646 A1 | 5/2012 | Alexander |
| 2012/0137015 A1 | 5/2012 | Sun |
| 2012/0147954 A1 | 6/2012 | Kasai et al. |
| 2012/0159530 A1* | 6/2012 | Ahrens ............ H04N 21/45457 725/32 |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0198489 A1 | 8/2012 | O'Connell et al. |
| 2012/0213495 A1* | 8/2012 | Hafeneger ........... G11B 27/034 386/282 |
| 2012/0225693 A1 | 9/2012 | Sirpal et al. |
| 2012/0233631 A1* | 9/2012 | Geshwind ........ H04N 21/44016 725/35 |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1* | 12/2012 | Patton ................. G06Q 10/10 709/204 |
| 2012/0324491 A1* | 12/2012 | Bathiche ............. H04H 60/33 725/10 |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1* | 2/2013 | Roberts ............. H04L 65/1093 709/219 |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0097410 A1 | 4/2013 | Bourges-Sevenier |
| 2013/0097643 A1 | 4/2013 | Stone et al. |
| 2013/0117248 A1 | 5/2013 | Bhogal et al. |
| 2013/0120114 A1* | 5/2013 | Gu ..................... G06F 7/02 340/5.83 |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0167168 A1 | 6/2013 | Ellis et al. |
| 2013/0173765 A1* | 7/2013 | Korbecki ......... H04N 21/42209 709/221 |
| 2013/0177294 A1 | 7/2013 | Kennberg |
| 2013/0188923 A1 | 7/2013 | Hartley et al. |
| 2013/0195427 A1 | 8/2013 | Sathish |
| 2013/0202265 A1 | 8/2013 | Arrasvuori et al. |
| 2013/0204710 A1 | 8/2013 | Boland et al. |
| 2013/0205314 A1* | 8/2013 | Ramaswamy ... H04N 21/44218 725/14 |
| 2013/0219425 A1 | 8/2013 | Swartz |
| 2013/0235152 A1 | 9/2013 | Hannuksela et al. |
| 2013/0235270 A1 | 9/2013 | Sasaki et al. |

(56) References Cited

U.S. PATENT DOCUMENTS

| | | |
|---|---|---|
| 2013/0254292 A1 | 9/2013 | Bradley |
| 2013/0259442 A1 | 10/2013 | Bloch et al. |
| 2013/0268620 A1* | 10/2013 | Osminer ............ H04N 21/2353 709/217 |
| 2013/0271453 A1 | 10/2013 | Ruotsalainen et al. |
| 2013/0282917 A1 | 10/2013 | Reznik et al. |
| 2013/0283401 A1* | 10/2013 | Pabla ................ G06F 21/554 726/30 |
| 2013/0290818 A1 | 10/2013 | Arrasvuori et al. |
| 2013/0298146 A1* | 11/2013 | Conrad ............... H04N 21/252 725/12 |
| 2013/0308926 A1 | 11/2013 | Jang et al. |
| 2013/0328888 A1 | 12/2013 | Beaver et al. |
| 2013/0330055 A1* | 12/2013 | Zimmermann .... H04N 21/2743 386/240 |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1* | 1/2014 | Greenzeiger ......... G06Q 30/02 706/47 |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1* | 3/2014 | Bloch ................ H04N 21/8456 725/37 |
| 2014/0085196 A1 | 3/2014 | Zucker et al. |
| 2014/0086445 A1* | 3/2014 | Brubeck .......... H04N 21/26258 382/100 |
| 2014/0094313 A1 | 4/2014 | Watson et al. |
| 2014/0101550 A1 | 4/2014 | Zises |
| 2014/0105420 A1 | 4/2014 | Lee |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0143298 A1 | 5/2014 | Klotzer et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0317638 A1 | 10/2014 | Hayes |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1* | 1/2015 | Chen ................ H04N 21/44008 725/12 |
| 2015/0033266 A1* | 1/2015 | Klappert ............ H04N 21/4334 725/52 |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1* | 3/2015 | Bloch ................ H04N 21/812 725/32 |
| 2015/0070458 A1 | 3/2015 | Kim et al. |
| 2015/0070516 A1* | 3/2015 | Shoemake ........ H04N 21/4542 348/207.11 |
| 2015/0074721 A1 | 3/2015 | Fishman et al. |
| 2015/0104144 A1 | 4/2015 | Minemura |
| 2015/0104155 A1 | 4/2015 | Bloch et al. |
| 2015/0106845 A1 | 4/2015 | Popkiewicz et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181291 A1* | 6/2015 | Wheatley ............... H04N 21/84 725/10 |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0228307 A1* | 8/2015 | Cabanero ................ G06F 16/40 386/241 |
| 2015/0256861 A1 | 9/2015 | Oyman |
| 2015/0258454 A1 | 9/2015 | King et al. |
| 2015/0278986 A1 | 10/2015 | Edwin et al. |
| 2015/0286716 A1* | 10/2015 | Snibbe .................. G06F 16/178 707/610 |
| 2015/0293675 A1* | 10/2015 | Bloch ................ G06F 3/04847 715/723 |
| 2015/0294685 A1* | 10/2015 | Bloch ................ H04N 21/8541 386/278 |
| 2015/0304698 A1 | 10/2015 | Redol |
| 2015/0310660 A1 | 10/2015 | Mogilefsky et al. |
| 2015/0318018 A1* | 11/2015 | Kaiser ................ G11B 27/102 386/241 |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2015/0373385 A1 | 12/2015 | Straub |
| 2016/0009487 A1 | 1/2016 | Edwards et al. |
| 2016/0021412 A1* | 1/2016 | Zito, Jr. ............... H04N 21/251 725/13 |
| 2016/0029002 A1 | 1/2016 | Balko |
| 2016/0037217 A1* | 2/2016 | Harmon ........... H04N 21/45457 725/9 |
| 2016/0057497 A1* | 2/2016 | Kim ................ H04N 21/42203 725/10 |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0086585 A1 | 3/2016 | Sugimoto |
| 2016/0094875 A1* | 3/2016 | Peterson .......... H04N 21/44016 725/41 |
| 2016/0099024 A1 | 4/2016 | Gilley |
| 2016/0100226 A1 | 4/2016 | Sadler et al. |
| 2016/0104513 A1* | 4/2016 | Bloch .................... G11B 27/34 715/720 |
| 2016/0105724 A1 | 4/2016 | Bloch et al. |
| 2016/0132203 A1 | 5/2016 | Seto et al. |
| 2016/0134946 A1 | 5/2016 | Glover et al. |
| 2016/0142889 A1 | 5/2016 | O'Connor et al. |
| 2016/0150278 A1* | 5/2016 | Greene ................ H04N 21/438 725/28 |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1 | 8/2016 | Fahnestock |
| 2016/0277779 A1 | 9/2016 | Zhang et al. |
| 2016/0303608 A1 | 10/2016 | Jossick |
| 2016/0321689 A1 | 11/2016 | Turgeman |
| 2016/0322054 A1 | 11/2016 | Bloch et al. |
| 2016/0323608 A1* | 11/2016 | Bloch .................. H04N 21/632 |
| 2016/0337691 A1 | 11/2016 | Prasad et al. |
| 2016/0344873 A1* | 11/2016 | Jenzeh ................ H04M 15/866 |
| 2016/0365117 A1 | 12/2016 | Boliek et al. |
| 2016/0366454 A1 | 12/2016 | Tatourian et al. |
| 2017/0006322 A1* | 1/2017 | Dury ....................... A63F 13/49 |
| 2017/0032562 A1 | 2/2017 | Block et al. |
| 2017/0041372 A1 | 2/2017 | Hosur |
| 2017/0062012 A1* | 3/2017 | Bloch .................. G11B 27/36 |
| 2017/0142486 A1 | 5/2017 | Masuda |

(56) References Cited

U.S. PATENT DOCUMENTS

| | | | |
|---|---|---|---|
| 2017/0149795 A1* | 5/2017 | Day, II | H04L 63/108 |
| 2017/0178409 A1 | 6/2017 | Bloch et al. | |
| 2017/0178601 A1 | 6/2017 | Bloch et al. | |
| 2017/0195736 A1 | 7/2017 | Chai et al. | |
| 2017/0264920 A1* | 9/2017 | Mickelsen | G06K 9/00335 |
| 2017/0286424 A1 | 10/2017 | Peterson | |
| 2017/0289220 A1 | 10/2017 | Bloch et al. | |
| 2017/0295410 A1 | 10/2017 | Bloch et al. | |
| 2017/0326462 A1 | 11/2017 | Lyons et al. | |
| 2017/0337196 A1 | 11/2017 | Goela et al. | |
| 2017/0345460 A1 | 11/2017 | Bloch et al. | |
| 2018/0007443 A1 | 1/2018 | Cannistraro et al. | |
| 2018/0014049 A1 | 1/2018 | Griffin et al. | |
| 2018/0025078 A1 | 1/2018 | Quennesson | |
| 2018/0048831 A1 | 2/2018 | Berwick et al. | |
| 2018/0060430 A1 | 3/2018 | Lu | |
| 2018/0068019 A1 | 3/2018 | Novikoff et al. | |
| 2018/0095645 A1 | 4/2018 | Subudhi et al. | |
| 2018/0115592 A1 | 4/2018 | Samineni | |
| 2018/0130501 A1 | 5/2018 | Bloch et al. | |
| 2018/0176573 A1 | 6/2018 | Chawla et al. | |
| 2018/0191574 A1 | 7/2018 | Vishnia et al. | |
| 2018/0254067 A1 | 9/2018 | Elder | |
| 2018/0262798 A1* | 9/2018 | Ramachandra | H04N 21/4318 |
| 2018/0300852 A1 | 10/2018 | Chen et al. | |
| 2018/0300858 A1 | 10/2018 | Chen et al. | |
| 2018/0310049 A1 | 10/2018 | Takahashi et al. | |
| 2018/0314959 A1* | 11/2018 | Apokatanidis | G06N 5/04 |
| 2018/0376205 A1* | 12/2018 | Oswal | G02B 27/0172 |
| 2019/0005716 A1 | 1/2019 | Singh et al. | |
| 2019/0066188 A1 | 2/2019 | Rothschild | |
| 2019/0069038 A1 | 2/2019 | Phillips | |
| 2019/0069039 A1 | 2/2019 | Phillips | |
| 2019/0075367 A1 | 3/2019 | van Zessen et al. | |
| 2019/0090002 A1 | 3/2019 | Ramadorai et al. | |
| 2019/0098371 A1 | 3/2019 | Keesan | |
| 2019/0104342 A1* | 4/2019 | Catalano | H04N 21/4532 |
| 2019/0132639 A1* | 5/2019 | Panchaksharaiah | H04N 21/2387 |
| 2019/0139314 A1 | 5/2019 | Marsh et al. | |
| 2019/0166412 A1* | 5/2019 | Panchaksharaiah | H04N 21/26258 |
| 2019/0182525 A1 | 6/2019 | Steinberg et al. | |
| 2019/0238719 A1* | 8/2019 | Alameh | H04W 12/02 |
| 2019/0335225 A1 | 10/2019 | Fang et al. | |
| 2019/0354936 A1* | 11/2019 | Deluca | A63B 24/0062 |
| 2020/0023157 A1 | 1/2020 | Lewis et al. | |
| 2020/0029128 A1 | 1/2020 | Erskine | |
| 2020/0037047 A1 | 1/2020 | Cheung et al. | |
| 2020/0059699 A1 | 2/2020 | Malev et al. | |
| 2020/0169787 A1* | 5/2020 | Pearce | H04N 21/4755 |
| 2020/0193163 A1 | 6/2020 | Chang et al. | |
| 2020/0344508 A1 | 10/2020 | Edwards et al. | |
| 2021/0263564 A1 | 8/2021 | Chen et al. | |
| 2022/0046291 A1 | 2/2022 | Jiang et al. | |

FOREIGN PATENT DOCUMENTS

| | | |
|---|---|---|
| DE | 2359916 A1 | 6/1975 |
| DE | 004038801 A1 | 6/1992 |
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2003-245471 A | 9/2003 |
| JP | 2008005288 A | 1/2008 |
| KR | 2004/0005068 A | 1/2004 |
| KR | 2010/0037413 A | 4/2010 |
| WO | WO-1996/013810 A1 | 5/1996 |
| WO | WO-1996013810 A1 | 5/1996 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009125404 A2 | 10/2009 |
| WO | WO-2009/137919 A1 | 11/2009 |

OTHER PUBLICATIONS

Archos Gen 5 English User Manual Version 3.0, Jul. 26, 2007, p. 1-81.

Bartlett, "iTunes 11: Howto Queue Next Song," *Technioages*, Oct. 6, 2008, pp. 1-8, Retrieved from the Internet on Dec. 26, 2013, http://www.technipages.com/itunes-queue-next-song.html.

International Search Report and Written Opinion for International Patent Application PCT/IB2013/001 dated Jul. 31, 2013 (11 pages).

International Search Report for International Application PCT/IL2010/000362 dated Aug. 25, 2010 (6 pages).

International Search Report for International Patent Application PCT/IL2012/000080 dated Aug. 9, 2012 (4 pages).

International Search Report for International Patent Application PCT/IL2012/000081 dated Jun. 28, 2012 (4 pages).

Labs.byHook: "Ogg Vorbis Encoder for Flash: Alchemy Series Part 1," Retrieved from Internet on on Dec. 17, 2012: URL:http://labs.byhook.com/2011/02/15/ogg-vorbis-encoder-for-flash-alchem-y-series-part-1/, 2011, 6 pages.

Miller, Gregor et al., "MiniDiver: A Novel Mobile Media Playback Interface for Rich Video Content on an iPhoneTM", Entertainment Computing A ICEC 2009, Sep. 3, 2009, pp. 98-109.

Sodagar, I., "The MPEG-DASH Standard for Multimedia Streaming Over the Internet", IEEE Multimedia, IEEE Service Center, New York, NY US, (2011) 18(4): 62-67.

Supplemental European Search Report for EP13184145 dated Jan. 30, 2014 (5 pages).

Supplemental European Search Report for EP10774637.2 (PCT/IL2010/000362) dated Jun. 28, 2012 (6 pages).

Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).

U.S. Appl. No. 12/706,721 9,190,110 Published as US2010/0293455, System and Method for Assembling a Recorded Composition. filed Feb. 17, 2010.

U.S. Appl. No. 13/033,916 9,607,655 Published as US2011/0200116, System and Method for Seamless Multimedia Assembly, filed Feb. 24, 2011.

U.S. Appl. No. 13/034,645 Published as U52011/0202562, System and Method for Data Mining Within Interactive Multimedia. filed Feb. 24, 2011.

U.S. Appl. No. 14/884,285 Published as U52016/0170948, System and Method for Assembling a Recorded Composition, filed Oct. 15, 2015.

U.S. Appl. No. 14/639,579 Published as US2015/0199116, Progress Bar for Branched Videos, filed Mar. 5, 2015.

U.S. Appl. No. 15/481,916 Published as US 2017-0345460, Systems and Methods for Creating Linear Video From Branched Video, fied Apr. 7, 2017.

U.S. Appl. No. 14/249,665 U.S. Pat. No. 9,792,026 Published as US2015/0293675, Dynamic Timeline for Branch Video, filed Apr. 10, 2014.

U.S. Appl. No. 15/703,462 Published as US-2018-0130501-A1, Systems and Methods for Dynamic Video, filed Sep. 13, 2017.

U.S. Appl. No. 14/700,845 Published as US2016/0323608, Systems and Methods for Nonlinear Video Playback Using Linear Real-Time Video Players, filed Apr. 30, 2015.

U.S. Appl. No. 14/835,857 Published as US2017/0062012, Systems and Methods for Adaptive and Responsive Video, filed Aug. 26, 2015.

U.S. Appl. No. 15/085,209 Published as US2017/0289220, Media Stream Rate Synchronization, filed Mar. 30, 2016.

U.S. Appl. No. 15/395,477 Published as US2018/0191574, Systems and Methods for Dynamic Weighting of Branched Video Paths, filed Dec. 30, 2016.

(56) References Cited

OTHER PUBLICATIONS

U.S. Appl. No. 16/283,066, Dynamic Library Display for Interactive Videos, filed Dec. 22, 2019.
U.S. Appl. No. 16/591,103, Systems and Methods for Dynamically Adjusting Video, filed Oct. 2, 2019.
U.S. Appl. No. 12/706,721, now U.S. Pat. No. 9,190,110, the Office Actions dated Apr. 26, 2012, Aug. 17, 2012, Mar. 28, 2013, Jun. 20, 2013, Jan. 3, 2014, Jul. 7, 2014, and Dec. 19, 2014; the Notices of Allowance dated Jun. 19, 2015, Jul. 17, 2015, Jul. 29, 2015, Aug. 12, 2015, and Sep. 14, 2015.
U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017, Aug. 10, 2018, Jul. 5, 2016 and Apr. 5, 2019.
U.S. Appl. No. 14/884,285, the Office Action dated Oct. 5, 2017, Jul. 26 2018 and Jul. 11, 2019.
U.S. Appl. No. 14/107,600, now U.S. Pat. No. 10,448,119, the Office Actions dated Dec. 19, 2014, Jul. 8, 2015, Jun. 3, 2016, Mar. 8, 2017, Oct. 10, 2017 and Jul. 25, 2018, Notice of Allowance dated Dec. 31, 2018 and Apr. 25, 2019.
U.S. Appl. o. 14/139,996, now U.S. Pat. No. 9,641,898, the Office Actions dated Jun. 18, 2015, Feb. 3, 2016 and May 4, 2016; and the Notice of Allowance dated Dec. 23, 2016.
U.S. Appl. No. 14/249,627, now U.S. Pat.t No. 9,653,115, the Office Actions dated Jan. 14, 2016 and Aug. 9, 2016; and the Notice of Allowance dated Jan. 13, 2017.
U.S. Appl. No. 15/481,916, the Office Actions dated Oct. 6, 2017, Aug. 6, 2018, and Mar. 8, 2019.
U.S. Appl. No. 14/249,665, now U.S. Pat. No. 9,792,026, the Office Actions dated May 16, 2016 and Feb. 22, 2017; and the Notice of Allowance dated Jul. 2, 2017 and Jul. 24, 2017.
U.S. Appl. No. 15/703,462, the Office Action dated JUn. 21, 2019.
U.S. Appl. No. 14/534,626, the Office Actions dated Nov. 25, 2015, Jul. 5, 2016, Jun. 5, 2017, Mar. 2, 2018, Sep. 6, 2018 and May 8, 2019.
U.S. Appl. No. 14/700,845, the Office Actions dated May 20, 2016, Dec. 2, 2016, May 22, 2017, Nov. 28, 2017, Jun. 27, 2018 and Feb. 19, 2019.
U.S. Appl. No. 14/835,857, the Office Actions dated Sep. 23, 2016, Jun. 5, 2017 and Aug. 9, 2018, and the Advisory Action dated Oct. 20, 2017; Notice of Allowances dated Feb. 25, 2019 and Jun. 7, 2019.
U.S. Appl. No. 14/978,464, the Office Actions dated Sep. 8, 2017, May 18, 2018, Dec. 14, 2018 and Jul. 25, 2019.
U.S. Appl. No. 14/978,491, the Office Actions dated Sep. 8, 2017, May 25, 2018, Dec. 14, 2018 and Aug. 12, 2019.
U.S. Appl. No. 15/085,209, the Office Actions dated Feb. 26, 2018 and Dec. 31, 2018; the Notice of Allowance dated Aug. 12, 2019.
U.S. Appl. No. 15/165,373, the Office Actions dated Mar. 24, 2017, Oct. 11, 2017, May 18, 2018, Feb. 1, 2019 and Aug. 8, 2019.
U.S. Appl. No. 15/863,191, now U.S. Pat. No. 10,257,578, Notice of Allowance dated Jul. 5, 2018 and Nov. 23, 2018.
U.S. Appl. No. 14/884,285 Published as US2017/0178601, Systems and Methods for Assembling a Recorded Compositon, filed Oct. 15, 2015.
U.S. Appl. No. 13/034,645 Published as US2011/0202562, System and Method for Data Mining Within Interactive Multimedia, filed Feb. 24, 2011.
U.S. Appl. No. 14/335,381 U.S. Pat. No. 9,530,454 Published as US2015/0104155, Systems and Methods for Real-Time Pixel Switching, dated Jul. 18, 2014.
U.S. Appl. No. 14/249,627 U.S. Pat. No. 9,653,115 Published as US 2015-0294685, Video Systems and Methods for Creating Linear Video From Branched Video, filed Apr. 10, 2014.
U.S. Appl. No. 16/752,193, Systems and Methods for Nonlinear Video Playback Using Linear Real-Time Video Players, filed Jan. 24, 2020.
U.S. Appl. No. 15/395,477 Published as US2018/091574, Systems and Methods for Dynamic Weighting of Branched Video Paths, filed Dec. 30, 2016.

U.S. Appl. No. 16/283,066, Dynamic Library Display for Interactive Videos, filed Feb. 22, 2019.
U.S. Appl. No. 16/591,103, Systems and Methos for Dynamically Adjusting Video Aspect Ratios, filed Oct. 2, 2019.
U.S. Appl. No. 16/793,201, System and Methods for Detecting Anomalous Activities for Interactive Videos, filed Feb. 18, 2020.
U.S. Appl. No. 12/706,721, now U.S. Pat. No. 9,190,110, the Office Actions dated Apr. 26, 2012, Aug. 17 2012, Mar. 28, 2013, Jun. 20, 2013, Jan. 3, 2014, Jul. 7, 2014, and Dec. 19, 2014; the Notices of Allowances dated Jun. 19, 2015, Jul. 17, 2015, Jul. 29, 2015, Aug. 12, 2015, and Sep. 14, 2015.
U.S. Appl. No. 14/884,284, the Office Actions dated Sep. 8, 2017, May 18, 2018, Dec. 14, 2018, Jul. 25, 2019, Nov. 18, 2019 and Feb. 21, 2020.
U.S. Appl. No. 13/033,916, now U.S. Pat. No. 9,607,655, the Office Actions dated Jun. 7, 2013, Jan. 2, 2014, Aug. 28, 2014, Jan. 5, 2015, Jul. 9, 2015, and Jan. 5, 2016; the Advisory Action dated May 11, 2016; and the Notice of Allowance dated Dec. 21, 2016.
U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017, Aug. 10, 2018, Jul. 5, 2016, Apr. 5, 2019 and Dec. 26, 2019.
U.S. Appl. No. 13/437,164, now U.S. Pat. No. 8,600,220, the Notice of Allowance dated Aug. 9, 2013.
U.S. Appl. No. 14/069,694, now U.S. Pat. No. 9,271,015, the Office Actions dated Apr. 27, 2015 and Aug. 31, 2015, the Notice of Allowance dated Oct. 13, 2015.
U.S. Appl. No. 13/622,780, now U.S. Pat. No. 8,860,882, the Office Action dated Jan. 16, 2014, the Notice of Allowance dated Aug. 4, 2014.
U.S. Appl. No. 13/622,795, now U.S. Pat. No. 9,009,619, the Office Actions dated May 23, 2014 and Dec. 1, 2014, the Notice of Allowance dated Jan. 9, 2015.
U.S. Appl. No. 14/639,579, the Office Actions dated May 3, 2017, Nov. 22, 2017 and Jun. 26, 2018, the Notice of Allowance dated Feb. 8, 2019 and Jul. 11, 2019
U.S. Appl. No. 13/838,830, now U.S. Pat. No. 9,257,148, the Office Action dated May 7, 2015, Notice of Allowance dated Nov. 6, 2015.
U.S. Appl. No. 14/984,821, now U.S. Pat. No. 10,418,066, the Office Actions dated Jun. 1, 2017, Dec. 6, 2017, and Oct. 5, 2018; the Notice of Allowance dated May 7, 2019.
U.S. Appl. No. 13/921,536, now U.S. Pat. No. 9,832,516, the Office Actions dated Feb. 25, 2015, Oct. 20, 2015, Aug. 26, 2016 and Mar. 8, 2017, the Advisory Action dated Jun. 21, 2017, and Notice of Allowance dated Sep. 12, 2017.
U.S. Appl. No. 14/107,600, now U.S. Pat. No. 10,448,119, the Office Actions dated Dec. 19, 2014, Jul. 8, 2015, Jun. 3, 2016, Mar. 8, 2017, Oct. 10, 2017 and Jul. 25, 2018, Notices of Allowance dated Dec. 31, 2018 and Apr. 25, 2019.
U.S. Appl. No. 14/335,381, now U.S. Pat. No. 9,530,454, the Office Action dated Feb. 12, 2016; and the Notice of Allowance dated Aug. 24, 2016.
U.S. Appl. No. 14/139,996, now U.S. Pat. No. 9,641,898, the Office Actions dated Jun. 18, 2015, Feb. 3, 2016 and May 4, 2016; and the Notice of Allowance dated Dec. 23, 2016.
U.S. Appl. No. 14/140,007, now U.S. Pat. No. 9,520,155, the Office Actions dated Sep. 8, 2015 and Apr. 26, 2016; and the Notice of Allowance dated Oct. 11, 2016.
U.S. Appl. No. 14/249,627, now U.S. Pat. No. 9,653,115, the Office Actions dated Jan. 14, 2016 and Aug. 9, 2016; and the Notice of Allowance dated Jan. 13, 2017.
U.S. Appl. No. 15/481,916, the Office Actions dated Oct. 6, 2017, Aug. 6, 2018, Mar. 8, 2019, Nov. 27, 2019.
U.S. Appl. No. 14/249,665, now U.S. Pat. No. 9,792,026, the Office Actions dated May 16, 2016 and Feb. 22, 2017; and the Notices of Allowance dated Jun. 2, 2017 and Jul. 24, 2017.
U.S. Appl. No. 14/509,700, now U.S. Pat. No. 9,792,957, the Office Action dated Oct. 28, 2016; and the Notice of Allowance dated Jun. 15, 2017.
U.S. Appl. No. 15/703,462, the Office Action dated Jun. 21, 2019, and Dec. 27, 2019; and the Notice of Allowance dated Feb. 10, 2020.

(56) References Cited

OTHER PUBLICATIONS

U.S. Appl. No. 14/534,626, the Office Actions dated Nov. 25, 2015, Jul. 5, 2016, Jun. 5, 2017, Mar. 2, 2018, Sep. 26, 2018, May 8, 2019 and Dec. 27, 2019.
U.S. Appl. No. 14/700,845, now U.S. Pat. No. 9,653,115, the Office Actions dated May 20, 2016, Dec. 2, 2016, May 22, 2017, Nov. 28, 2017, Jun. 27, 2018 and Feb. 19, 2019 and the Notice of Allowance dated Oct. 21, 2019.
U.S. Appl. No. 14/700,862, now U.S. Pat. No. 9,672,868, the Office Action dated Aug. 26, 2016; and the Notice of Allowance dated Mar. 9, 2017.
U.S. Appl. No. 14/835,857, now U.S. Pat. No. 10,460,765, the Office Actions dated Sep. 23, 2016, Jun. 5, 2017 and Aug. 9, 2018, and the Advisory Action dated Oct. 20, 2017; Notice of Allowances dated Feb. 25, 2019 and Jun. 7, 2019.
U.S. Appl. No. 14/978,464, the Office Actions dated Jul. 25, 2019 Dec. 14, 2018, May 18, 2018, and Sep. 8, 2017.
U.S. Appl. No. 16/559,082, the Office Actions dated Feb. 20, 2020; the Notice of Allowance dated Feb. 20, 2020.
U.S. Appl. No. 14/978,464, the Office Action dated Jul. 25, 2019 Dec. 14, 2018, May 18, 2018, and Sep. 8, 2017.
U.S. Appl. No. 14/978,491, the Office Actions dated Sep. 8, 2017, May 25, 2018, Dec. 14, 2018, Aug. 12, 2019 and Dec. 23, 2019.
U.S. Appl. No. 15/085,209, now U.S. Pat. No. 10,462,202, the Office Actions dated Feb. 26, 2018 and Dec. 31, 2018; the Notice of Allowance dated Aug. 12, 2019.
U.S. Appl. No. 15/165,373, the Office Actions dated Mar. 24, 2017, Oct. 11, 2017, May 18, 2018; Feb. 1, 2019, Aug. 8, 2019, and Jan. 3, 2020.
U.S. Appl. No. 15/189,931, now U.S. Pat. No. 10,218,760, the Office Actions dated Apr. 6, 2018, Notice of Allowance dated Oct. 24, 2018.
U.S. Appl. No. 15/395,477, the Office Actions dated Nov. 2, 2018, and Aug. 16, 2019.
U.S. Appl. No. 10/257,578, now U.S. Pat. No. U.S. Appl. No. 10/257,578, Notices of Allowance dated Jul. 5, 2018 and Nov. 23, 2018.
U.S. Appl. No. 16/283,066, the Office Action dated Jan. 6, 2020.
U.S. Appl. No. 13/034,645 Published US2011/0202562, System and Method for Data Minin Within Interactive Multimedia, filed Feb. 24, 2011.
U.S. Appl. No. 13/838,830 U.S. Pat. No.9,257,148 Published as US2014/0270680, System and Method for Synchronization of Selectably Presentable Media Streams, filed Mar. 15, 2013.
U.S. Appl. No. 15/356,913, Systems and Methods for Real-Time Pixel Switching, filed Nov. 21, 2016.
U.S. Appl. No. 14/249,627 U.S. Pat. No. 9,653,115 Published as US 2015-0294685, Video Systems and Methods for Creating Linear Video From Branched, filed Apr. 10, 2014.
U.S. Appl. No. 15/481,916 Published as US 2017-0345460, Systems and Methods for Creating Linear Video From Branched Video, filed Apr. 7, 2017.
U.S. Appl. No. 4/249,665 U.S. Pat. No. 9,792,026 Published as US2015/0293675, Dynamic Timeline for Branched Video, filed Apr. 10, 2014.
U.S. Appl. No. 14/534,626 Published as US-2018-0130501-A1, Systems and Methods for Dynamic Video Bookmarking, filed Sep. 13, 2017.
U.S. Appl. No. 16/865,896, Systems and Methods for Dynamic Video Bookmarking, filed May 4, 2020.
U.S. Appl. No. 17/138,434, Systems and Methods for Dynamic Video Bookmarking, filed Dec. 30, 2020.
U.S. Appl. No. 16/559,082, Systems and Methods for Adaptive and Responsive Video, filed Sep. 3, 2019.
U.S. Appl. No. 16/800,994, Systems and Methods for Adaptive and Responsive Video, filed Feb. 25, 2020.
U.S. Appl. No. 14/978,464 Published as US2017/0178601, Intelligent Buffering of Large-Scale Video, filed Dec. 22, 2015.
U.S. Appl. No. 14/978,491 Published as US2017/0178409, Seamless Transitions in Large-Scale Video, filed Dec. 22, 2015.
U.S. Appl. No. 15/395,477, Systems and Methods for Dynamic Weighting of Branched Video Paths, filed Dec. 30, 2016.
U.S. Appl. No. 17/091,149, Dynamic Library Display for Interactive Videos, filed Nov. 6, 2020.
U.S. Appl. No. 16/591,103, Systems and Methods for Dynamically Adjusting Video Aspect Ratios, filed Oct. 2, 2019.
U.S. Appl. No. 16/793,205, Dynamic Adaptation of Interactive Video Players Using Behavioral Analytics, filed Feb. 18, 2020.
U.S. Appl. No. 16/793,201, Systems and Methods for Detecting Anomalous Activities for Interactive Videos, filed Feb. 18, 2020.
U.S. Appl. No. 16/922,540, Systems and Methods for Seamless Audio and Video Endpoint Transitions, filed Jul. 7, 2020.
International Preliminary Report and Written Opinion of PCT/IL2012/000080 dated Aug. 27, 2013, 7 pages.
Marciel, M. et al., "Understanding the Detection of View Fraud in Video Content Portals", (Feb. 5, 2016), Cornell University, pp. 1-13.
U.S. Appl. No. 14/884,285 Published as US2017/0178601, Systems and Method for Assembling a Recorded Composition, filed Oct. 15, 2015.
U.S. Appl. No. 3/622,795 U.S. Pat. No. 9,009,619 Published as US2014/0082666, Progress Bar for Branched Videos, filed Sep. 19, 2012.
U.S. Appl. No. 3/838,830 U.S. Pat. No. 9,257,148 Published as US2014/0270680, System and Method for Synchronization of Selectably Presentable Media Streams, filed Mar. 15, 2013.
U.S. Appl. No. 13/921,536 U.S. Pat. No. 9,832,516 Published as U52014/0380167, Systems and Methods for Multiple Device Interaction with Selectably Presentable Media Streams, filed Jun. 19, 2013.
U.S. Appl. No. 7/138,434 Published as US2021/0366520, Systems and Methods for Dynamic Video Bookmarking, filed Dec. 30, 2020.
U.S. Appl. No. 17/701,168, Systems and Methods for Dynamic Video Bookmarking, filed Mar. 22, 2022.
U.S. Appl. No. 14/534,626 Published as US2016/0105724, Systems and Methods for Parallel Track Transitions, filed Nov. 6, 2014.
U.S. Appl. No. 14/978,464 U.S. Pat. No. 11/164,548 Published as US2017/0178601, Intelligent Buffering of Large-Scale Video, filed Dec. 22, 2015.
U.S. Appl. No. 15/165,373 Published as US2017/0295410, Symbiotic Interactive, filed May 26, 2016.
U.S. Appl. No. 17/328,261, Systems and Methods for Dynamic Weighting of Branched Video Paths, filed May 24, 2021.
U.S. Appl. No. 16/591,103 Published as US2021/0105433, Systems and Methods for Dynamically Adjusting Video Aspect Ratios, filed Oct. 2, 2019.
U.S. Appl. No. 16/793,205 Published as US2021/0258647, Dynamic Adaptation of Interactive Video Players Using Behavioral Analytics, filed Feb. 18, 2020.
U.S. Appl. No. 16/793,201 Published as US2021/0258640, Systems and Methods for Detecting Anomalous Activities for Interactive Videos, filed Feb. 18, 2020.
U.S. Appl. No. 16/922,540 Published as US2022/0014817, Systems and methods for seamless audio and video endpoint transitions, filed Jul. 7, 2020.
U.S. Appl. No. 17/462,222, Shader-based dynamic video manipulation, filed Aug. 31, 2021.
Google Scholar search, "Inserting metadata inertion advertising video", Jul. 16, 2021, 2 pages.
U.S. Appl. No. 12/706,721 U.S. Pat. No. 9,190,110 Published as US2010/0293455, System and Method for Assembling a Recorded Composition, filed Feb. 17, 2010.
U.S. Appl. No. 14/884,285 U.S. Pat. No. 11,314,936 Published as US2017/0178601, Systems and Method for Assembling a Recorded Composition, filed Oct. 15, 2015.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645 U.S. Pat. No. 11,232,458 Published as US2011/0202562, System and Method for Data Mining Within Interactive Multimedia, filed Feb. 24, 2011.
U.S. Appl. No. 17/551,847 Published as US2021/0366520, Systems and Methods for Data Mining Within Interactive Multimedia, filed Dec. 15, 2021.

(56) References Cited

OTHER PUBLICATIONS

U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 U.S. Pat. No. 10,474,334 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, dated Mar. 15, 2013.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 U.S. Pat. No. 10,448,119 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems for Seeking to Non-Key Frames, filed Dec. 24, 2013.
U.S. Appl. No. 14/249,627 U.S. Pat. No. 9,653,115 Published as US2015-0294685, Systems and Methods for Creating Linear Video From Branched Video, filed Apr. 10, 2014.
U.S. Appl. No. 15/481,916 U.S. Pat. No. 10,755,747 Published as US2017-0345460, Systems and Methods for Creating Linear Video From Branched Video, filed Apr. 7, 2017.
U.S. Appl. No. 16/986,977 Published as US2020/0365187, Systems and Methods for Creating Linear Video From Branched Video, filed Aug. 6, 2020.
U.S. Appl. No. 14/249,665 U.S. Pat. No. 9,792,026 Published as US2015/0293675, Dynamic Timeline for Branched Video, filed Apr. 10, 2014.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 14/534,626 U.S. Pat. No. 10,692,540 Published as US-2018-0130501-A1, Systems and Methods for Dynamic Video Bookmarking, filed Sep. 13, 2017.
U.S. Appl. No. 16/865,896 U.S. Pat. No. 10,885,944 Published as US2020/0265870, Systems and Methods for Dynamic Video Bookmarking, filed May 4, 2020.
U.S. Appl. No. 17/138,434 U.S. Pat. No. 11,348,618 Published as US2021/0366520, Systems and Methods for Dynamic Video Bookmarking, filed Dec. 30, 2020.
U.S. Appl. No. 17/701,168 Published as US2022/0215861, Systems and Methods for Dynamic Video Bookmarking, filed Mar. 22, 2022.
U.S. Appl. No. 14/534,626 Published as US2016/0105724, Systems and Methods for Parallel Track Transitions, filed Mar. 31, 2022.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 16/752,193 Published as US2020/0404382, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.
U.S. Appl. No. 16/559,082 Published as US2019/0392868, Systems and Methods for Adaptive and Responsive Video, filed Sep. 3, 2019.
U.S. Appl. No. 14/978,464 U.S. Appl. No. 11,164,548 Published as US2017/0178601, Intelligent Buffering of Large-Scale Video, filed Dec. 22, 2015.
U.S. Appl. No. 14/978,491 U.S. Pat. No. 11,128,853 Published as US2017/0178409, Seamless Transitions in Large-Scale Video, filed Dec. 22, 2015.
U.S. Appl. No. 17/403,703 Published as US2022/0038673, Seamless Transitions in Large-Scale Video, filed Aug. 16, 2021.
U.S. Appl. No. 15/085,209 U.S. Pat. No. 10,462,202 Published as US2017/0289220, Media Stream Rate Synchronization, filed Mar. 30, 2016.
U.S. Appl. No. 15/165,373 Published as US2017/0295410, Symbiotic Interactive Video, filed May 26, 2016.
U.S. Appl. No. 15/189,931 U.S. Pat. No. 10,218,760 Published as US2017/0374120, Dynamic Summary Generation for Real-time Switchable Videos, filed Jun. 22, 2016.
U.S. Appl. No. 15/395,477 U.S. Pat. No. 11,050,809 Published as US2018/0191574, Systems and Methods for Dynamic Weighting of Branched Video Paths, filed Dec. 30, 2016.
U.S. Appl. No. 15/395,477 Published as U52021/0281626, Systems and Methods for Dynamic Weighting of Branched Video Paths, filed Dec. 30, 2016.
U.S. Appl. No. 15/863,191 U.S. Pat. No. 10,257,578, Dynamic Library Display for Interactive Videos, filed Jan. 5, 2018.
U.S. Appl. No. 16/283,066 U.S. Pat. No. 10,856,049 Published as US2019/0349637, Dynamic Library Display for Interactive Videos, filed Feb. 22, 2019.
U.S. Appl. No. 17/091,149 Published as US2021/0306707, Dynamic Library Display for Interactive Videos, filed Nov. 6, 2020.
U.S. Appl. No. 16/591,103 Published as U52021/0105433, Systems and Methods for Dynamically Adjusting Video Aspect Ratios, filed Oct. 2, 2019.
U.S. Appl. No. 16/793,205 Published as U82021/0258647, Dynamic adaptation of interactive video players using behavioral analytics, filed Feb. 18, 2020.
U.S. Appl. No. 16/793,201, U.S. Pat. No. 11,245,961 Published as U52021/0258640, Systems and Methods for Detecting Anomalous Activities for Interactive Videos, filed Feb. 18, 2020.
U.S. Appl. No. 16/922,540 Published as U52022/0014817, Systems and Methods for Seamless Audio and Video Endpoint Transitions, filed Jul. 7, 2020.
U.S. Appl. No. 17/462,199, Shader-based dynamic video manipulation, filed Aug. 31, 2021.
U.S. Appl. No. 7/462,222, Shader-based dynamic video manipulation, filed Aug. 31, 2021.
U.S. Appl. No. 17/334,027, Automated platform for generating interactive videos, filed May 28, 2021.
U.S. Appl. No. 17/484,604, Discovery engine for interactive videos, filed Sep. 24, 2021.
U.S. Appl. No. 17/484,635, Video player integration within websites, filed Sep. 24, 2021.

\* cited by examiner

INTERACTIVE VIDEO DYNAMIC ADAPTATION AND USER PROFILING

FIELD OF THE INVENTION

The present disclosure relates generally to audiovisual presentations and, more particularly, to systems and methods for dynamically adapting the presentation of interactive videos based on user profiles.

BACKGROUND

Over the past decade there has been exponential growth in the prevalence of digital streaming media. Users frequently consume streaming media on their devices through streaming music services, video providers, social networks, and other media providers. Interactive streaming multimedia content, though less common, is also available. Existing forms of interactive videos allow a viewer to make choices on how to proceed through predefined video paths; however, this functionality is accomplished using separate video segments that are quickly transitioned to upon selection, resulting in a noticeable disconnect in audio and video between consecutive segments. Further still, such transitions rely on independent user or random selections, and there is no dynamic adaptation of the interactive video based on such selections.

SUMMARY

In one aspect, a computer-implemented method comprises the steps of: receiving a first video tree representing a first interactive video, the first video tree defining a plurality of branches in the first interactive video, each branch comprising one or more video segments; tracking information comprising at least one of (i) content of video segments played during presentation of the first interactive video and (ii) decisions of a user made during the presentation of the first interactive video, the decisions being associated with a plurality of branching points in the first interactive video; generating a profile for the user based at least in part on the tracked information, wherein the profile comprises a plurality of measured attributes relating to the user; receiving a second video tree representing a second interactive video, the second video tree defining a plurality of branches in the second interactive video, each branch comprising one or more video segments; and dynamically modifying presentation of the second interactive video based at least in part on the profile. Other aspects of the foregoing include corresponding systems and computer programs on non-transitory storage media.

The presentation of the second interactive video can include a presentation of the first interactive video at a later time. Each branch of a plurality of branches sourcing from a first one of the branching points in the first interactive video can have associated at least one attribute modifier, wherein each attribute modifier defines how a value of one of the measured attributes is modified upon the branch being selected during playback of the first interactive video. Generating the profile can include: determining that a particular tracked decision of the user resulted in a selection of a first one of the branches sourcing from the first branching point; and increasing or decreasing a value of at least one of the measured attributes based on the at least one attribute modifier associated with the first one of the branches. Generating the profile can also include associating or disassociating one or more tags with the user based on one of the tracked decisions. The profile can further be generated based on known data regarding the user, the known data comprising a location, a demographic attribute, or a social media account name.

Each of the measured attributes can include an attribute defining a characteristic of the user and an attribute defining a mood or emotional state of the user. Each measured attribute can include a value in a range having an upper bound value indicating that a user is maximally associated with the attribute and a lower bound value indicating that a user is minimally associated with the attribute. An initial value of each measured attribute can include a neutral value.

In one implementation, dynamically modifying presentation of the second interactive video comprises: identifying a branching point in the second video tree, wherein a plurality of branches source from the identified branching point; selecting a subset of the branches sourcing from the identified branch point based on one or more of the measured attributes in the profile; and during presentation of the second interactive video, upon the user reaching the identified branching point, providing to the user one or more options that correspond with the selected subset of branches, and not providing to the user options that correspond with branches sourcing from the identified branching point that are not included in the selected subset of branches.

In another implementation, dynamically modifying presentation of the second interactive video comprises: identifying a branching point in the second video tree, wherein a plurality of branches source from the identified branching point; and during presentation of the second interactive video, upon the user reaching the identified branching point, automatically selecting one of the branches sourcing from the identified branching point based on one or more of the measured attributes in the profile.

In another aspect, a computer-implemented method comprises the steps of: receiving a video tree representing an interactive video, the video tree defining a plurality of branches in the interactive video, each branch comprising one or more video segments; tracking information comprising at least one of (i) content of video segments played during presentation of the interactive video and/or videos previously played to a user and (ii) decisions of the user made during the presentation of the interactive video and/or the videos previously played to the user; generating a profile for the user based at least in part on the tracked information, wherein the profile comprises one or measured attributes relating to a mood or emotional state of the user; and dynamically modifying the presentation of the interactive video upon determining that a mood or emotional state event has occurred based at least in part on the measured attributes in the user profile. Other aspects of the foregoing include corresponding systems and computer programs on non-transitory storage media.

In one implementation, dynamically modifying the presentation of the interactive video upon determining that a mood or emotional state event has occurred comprises determining that one or more of the measured attributes has reached a respective mood or emotional state threshold, and, in response thereto: (i) selecting video content based on which mood or emotional state thresholds have been reached by the one or more measured attributes; and (ii) presenting the selected video content to the user.

In another implementation, dynamically modifying the presentation of the interactive video upon determining that a mood or emotional state event has occurred comprises determining that one or more of the measured attributes falls within a respective mood or emotional state range, and, in response thereto: (i) selecting video content based on which mood or emotional state ranges include the one or more measured attributes; and (ii) presenting the selected video content to the user.

In a further implementation, dynamically modifying the presentation of the interactive video upon determining that a mood or emotional state event has occurred comprises determining that a change in one or more of the measured attributes exceeds a threshold, and, in response thereto: (i) selecting video content based on which of the one or more measured attributes has a change that exceeds the threshold; and (ii) presenting the selected video content to the user.

In yet another implementation, dynamically modifying the presentation of the interactive video upon determining that a mood or emotional state event has occurred comprises determining that one or more of the measured attributes exhibits a trend, and, in response thereto: (i) selecting video content based on which of the one or more measured attributes exhibits the trend; and (ii) presenting the selected video content to the user.

Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Figure 1:
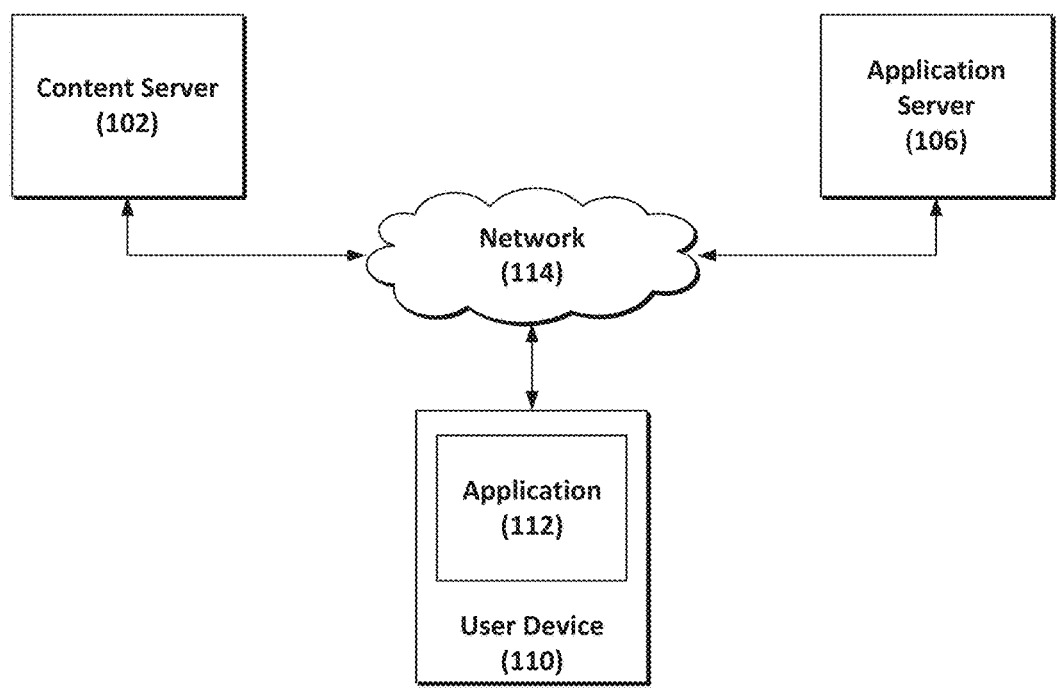
FIG. 1 depicts a high-level system architecture for providing interactive video according to an implementation.

Described herein are various implementations of methods and supporting systems for profiling user behavior during presentation of an interactive video and dynamically modifying presentation of that video or other interactive videos based on the profiled behavior. FIG. 1 depicts a high-level architecture of such a system according to an implementation. A media presentation having multiple video and/or audio streams can be presented to a user on a user device 110 having an application 112 capable of playing and/or editing the content. The user device 110 can be, for example, a smartphone, tablet, laptop, desktop, palmtop, television, gaming device, virtual reality headset, smart glasses, smart watch, music player, mobile telephone, workstation, or other computing device configured to execute the functionality described herein. The user device 110 can have output functionality (e.g., display monitor, touchscreen, image projector, etc.) and input functionality (e.g., touchscreen, keyboard, mouse, remote control, etc.).

The application 112 can be a video player and/or editor that is implemented as a native application, web application, or other form of software. In some implementations, the application 112 is in the form of a web page, widget, and/or Java, JavaScript, .Net, Silverlight, Flash, and/or other applet or plug-in that is downloaded to the user device 110 and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology, can also be employed.

Media content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

More generally, the techniques described herein can be implemented in any suitable hardware or software. If implemented as software, the processes can execute on a system capable of running one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented a computer including a processing unit, a system memory, and a system bus that couples various system components including the system memory to the processing unit.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

The media presentations referred to herein can be structured in various forms. For example, a particular media presentation can be an online streaming video having multiple tracks or streams that a user can switch among in real-time or near real-time. For example, a media presentation can be structured using parallel audio and/or video tracks as described in U.S. patent application Ser. No. 14/534,626, filed on Nov. 6, 2014, and entitled "Systems and Methods for Parallel Track Transitions," the entirety of which is incorporated by reference herein. More specifically, a playing video file or stream can have one or more parallel tracks that can be switched among in real-time automatically and/or based on user interactions. In some implementations, such switches are made seamlessly and substantially instantaneously, such that the audio and/or video of the playing content can continue without any perceptible delays, gaps, or buffering. In further implementations, switches among tracks maintain temporal continuity; that is, the tracks can be synchronized to a common timeline so that there is continuity in audio and/or video content when switching from one track to another (e.g., the same song is played using different instruments on different audio tracks; same storyline performed by different characters on different video tracks, and the like).

Such media presentations can also include interactive video structured in a video tree, hierarchy, or other form. A video tree can be formed by nodes that are connected in a branching, hierarchical, or other linked form. Nodes can each have an associated video segment, audio segment, graphical user interface (GUI) elements, and/or other associated media. Users (e.g., viewers) can watch a video that begins from a starting node in the tree and proceeds along connected nodes in a branch or path. Upon reaching a point during playback of the video where multiple video segments (child nodes) branch off from a segment (parent node), the user can interactively select the branch or path to traverse and, thus, the next video segment to watch.

As referred to herein, a particular branch or path in an interactive media structure, such as a video tree, can refer to a set of consecutively linked nodes between a starting node and ending node, inclusively, or can refer to some or all possible linked nodes that are connected subsequent to (e.g., sub-branches) or that include a particular node. Branched video can include seamlessly assembled and selectably presentable multimedia content such as that described in U.S. patent application Ser. No. 13/033,916, filed on Feb. 24, 2011, and entitled "System and Method for Seamless Multimedia Assembly" (the "Seamless Multimedia Assembly application"), and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree or other structure can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the end of the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles (as further described below), preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments can form a seamless multimedia content path or branch, and users can take multiple paths over multiple play-throughs, and experience different complete, start-to-finish, seamless presentations. Further, one or more multimedia segments can be shared among intertwining paths while still ensuring a seamless transition from a previous segment and to the next segment. The content paths can be predefined, with fixed sets of possible transitions in order to ensure seamless transitions among segments. The content paths can also be partially or wholly undefined, such that, in some or all instances, the user can switch to any known video segment without limitation. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. Some or all of the displayed options can hover and then disappear when the decision period ends or when an option has been selected. Further, a timer, countdown or other visual, aural, or other sensory indicator can be presented during playback of content segment to inform the user of the point by which he should (or, in some cases, must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

A segment that is played after (immediately after or otherwise) a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

Figure 2:
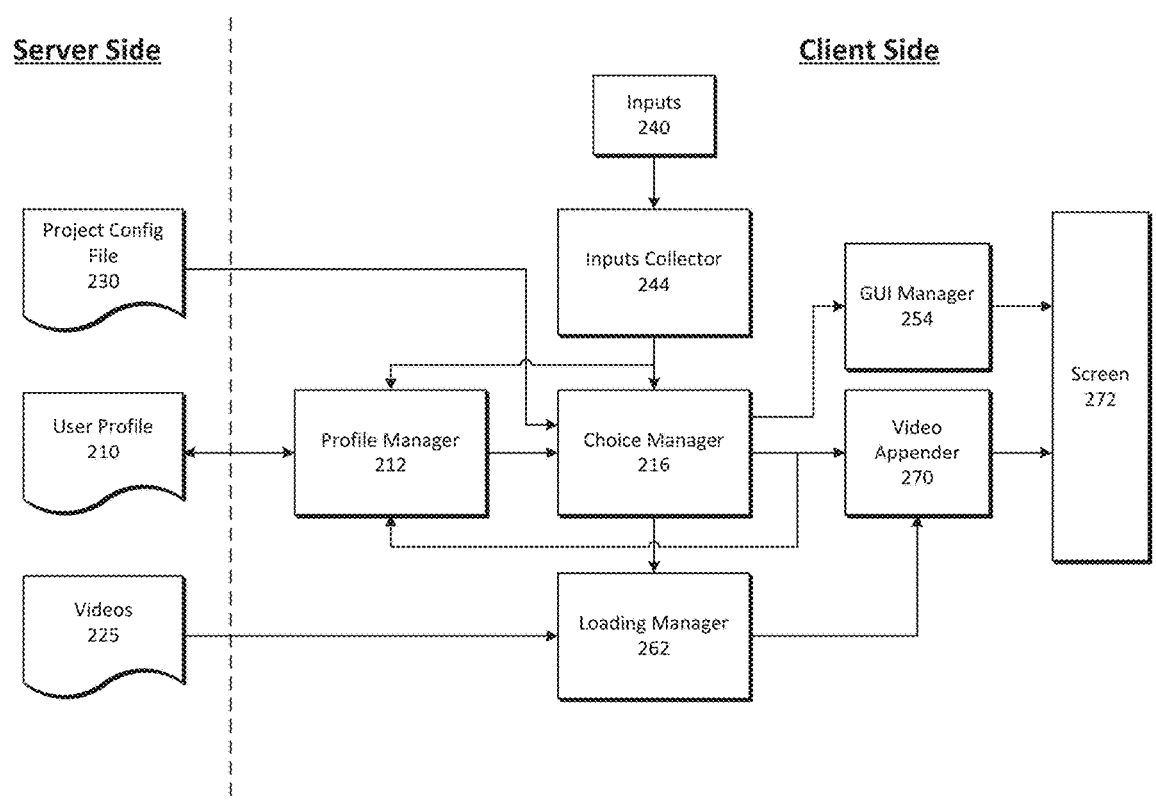
FIG. 2 depicts the components of an example client-side video player and its interactions with server-side components.

FIG. 2 depicts one implementation of a detailed architecture of client-side components in application 112 on user device 110, including inputs received from remote sources, such as content server 102 and application server 106. Client side components include Profile Manager 212, Choice Manager 216, Inputs Collector 244, GUI Manager 254, Loading Manager 262, and Video Appender 270. Profile Manager 212 receives user profile information from User Profile 210, which can exist locally on the client (user device 110) or, as depicted, be obtained externally from a remote server (e.g., content server 102 or application server 106). Profile Manager 212 can also provide information characterizing a user for storing back in User Profile 210. A different User Profile 210 can exist for each identifiable viewer of a media presentation, with each user identified by a unique ID and/or identification technique (e.g., a cookie stored locally on the user's device). Default user profile information can be provided when a viewer is anonymous or cannot otherwise be identified.

User Profile 210 can include information collected through a user's interaction with an interactive video and an interactive media player, as well as information obtained from other sources (e.g., detected location of user's device, information made available through a user's social media account, information provided by the user when creating an account with a provider of the interactive media player, and so on). Profile Manager 212 can use the information in User Profile 210 to cause the presentation of an interactive video to be dynamically modified, e.g., by adapting choices and content presented to the user to the user's previous or current behavior, or otherwise changing the presentation of the interactive video from its default state. For example, based on information in User Profile 210, Profile Manager 212 can direct Choice Manager 216 to select only a subset of choices (e.g., 2 of 3 choices) to provide to a viewer approaching a decision point, where Choice Manager 216 would otherwise provide a full set of choices (e.g., 3 of 3 choices) by default during presentation of the interactive video. Profile Manager 212 can also receive information from Inputs Collector 244 (this information can include, e.g., user interactions) and Choice Manager 216 (this information can include, e.g., a currently selected path in a video tree), which can be used to update User Profile 210.

Inputs Collector 244 receives user inputs 240 from input components such as a device display screen 272, keyboard, mouse, microphone, virtual reality headset, and the like. Such inputs 240 can include, for example, mouse clicks, keyboard presses, touchpad presses, eye movement, head movement, voice input, etc. Inputs Collector 244 provides input information based on the inputs 240 to Profile Manager 212 and Choice Manager 216, the latter of which also receives information from Profile Manager 212 as well as a Project Configuration File 230 to determine which video segment should be currently played and which video segments may be played or presented as options to be played at a later time (e.g., influenced by information from the User Profile 210). Choice Manager 216 notifies Video Appender 270 of the video segment to be currently played, and Video Appender 270 seamlessly connects that video segment to the video stream being played in real time. Choice Manager 216 notifies Loading Manager 262 of the video segments that may be played or presented as options to be played at a later time.

Project Configuration File 230 can include information defining the media presentation, such as the video tree or other structure, and how video segments can be linked together in various manners to form one or more paths. Project Configuration File 230 can further specify which audio, video, and/or other media files correspond to each segment (e.g., node in a video tree), that is, which audio, video, and/or other media should be retrieved when application 112 determines that a particular segment should be played. Additionally, Project Configuration File 230 can indicate interface elements that should be displayed or otherwise presented to users, as well as when the elements should be displayed, such that the audio, video, and interactive elements of the media presentation are synchronized. Project Configuration File 230 can be stored on user device 110 or can be remotely accessed by Choice Manager 216.

In some implementations, Project Configuration File 230 is also used in determining which media files should be loaded or buffered prior to being played (or potentially played). Because decision points can occur near the end of a segment, it may be necessary to begin transferring one or more of the potential next segments to viewers prior to a selection being made. For example, if a viewer is approaching a decision point with three possible branches, all three potential next segments can be preloaded partially or fully to ensure a smooth transition upon conclusion of the current segment. Intelligent buffering and progressive downloading of the video, audio, and/or other media content can be performed as described in U.S. patent application Ser. No. 13/437,164, filed Apr. 2, 2012, and entitled "Systems and Methods for Loading More Than One Video Content at a Time," the entirety of which is incorporated by reference herein.

Using information in Project Configuration File 230, Choice Manager 216 can inform GUI Manager 254 of which interface elements should be displayed to viewers on screen 272. Project Configuration File 230 can further indicate the specific timings for which actions can be taken with respect to the interface elements (e.g., when a particular element is active and can be interacted with). The interface elements can include, for example, playback controls (pause, stop, play, seek, etc.), segment option selectors (e.g., buttons, images, text, animations, video thumbnails, and the like, that a viewer can interact with during decision periods, the selection of which results in a particular multimedia segment being seamlessly played following the conclusion of the current segment), timers (e.g., a clock or other graphical or textual countdown indicating the amount of time remaining to select an option or next segment, which, in some cases, can be the amount of time remaining until the current segment will transition to the next segment), links, popups, an index (e.g., for browsing and/or selecting other multimedia content to view or listen to), and/or a dynamic progress bar such as that described in U.S. patent application Ser. No. 13/622,795, filed Sep. 19, 2012, and entitled "Progress Bar for Branched Videos," the entirety of which is incorporated by reference herein. In addition to visual elements, sounds or other sensory elements can be presented. For example, a timer can have a "ticking" sound synchronized with the movement of a clock hand. The interactive interface elements can be shared among multimedia segments or can be unique to one or more of the segments.

In addition to reading information from Project Configuration File 230, Choice Manager 216 is notified of user interactions (e.g., mouse clicks, keyboard presses, touchpad presses, eye movements, etc.) from Inputs Collector 244, which interactions can be translated into actions associated with the playback of a media presentation (e.g., segment selections, playback controls, etc.). Based thereon, Choice Manager 216 notifies Loading Manager 262, which can process the actions as further described below. Choice Manager 216 can also interface with Loading Manager 262 and Video Appender 270. For example, Choice Manager 216 can listen for user interaction information from Inputs Collector 244 and notify Loading Manager 262 when an interaction by the viewer (e.g., a selection of an option displayed during the video) has occurred. In some implementations, based on its analysis of received events, Choice Manager 216 causes the presentation of various forms of sensory output, such as visual, aural, tactile, olfactory, and the like.

As earlier noted, Choice Manager 216 can also notify Loading Manager 262 of video segments that may be played at a later time, and Loading Manger 262 can retrieve the corresponding videos 225 (whether stored locally or on, e.g., content server 102) to have them prepared for potential playback through Video Appender 270. Choice Manager 216 and Loading Manager 262 can function to manage the downloading of hosted streaming media according to a loading logic. In one implementation, Choice Manager 216 receives information defining the media presentation structure from Project Configuration File 230 and, using information from Inputs Collector 244 and Profile Manager 212, determines which media segments to download and/or buffer (e.g., if the segments are remotely stored). For example, if Choice Manager 216 informs Loading Manager 262 that a particular segment A will or is likely to be played at an upcoming point in the presentation timeline, Loading Manager 262 can intelligently request the segment for download, as well as additional media segments X, Y and Z that can be played following segment A, in advance of playback or notification of potential playback thereof. The downloading can occur even if fewer than all of X, Y, Z will be played (e.g., if X, Y and Z are potential segment choices branching off segment A and only one will be selected for playback).

In some implementations, Loading Manager 262 ceases or cancels downloading of content segments or other media if it determines that it is no longer possible for a particular media content segment (or other content) to be presented on a currently traversed media path. Referring to the above example, a user interacts with the video presentation such that segment Y is determined to be the next segment that will be played. The interaction can be received by Choice Manager 216 and, based on its knowledge of the path structure of the video presentation, Loading Manager 262 is notified to stop active downloads or dequeue pending downloads of content segments no longer reachable now that segment Y has been selected.

Video Appender 270 receives media content from Loading Manager 262 and instructions from Choice Manager 216 on which media segments to include in a media presentation. Video Appender 270 can analyze and/or modify raw video or other media content, for example, to concatenate two separate media streams into a single timeline. Video Appender 270 can also insert cue points and other event markers, such as junction events, into media streams. Further, Video Appender 270 can form one or more streams of bytes from multiple video, audio or other media streams, and feed the formed streams to a video playback function such that there is seamless playback of the combined media content on display screen 272 (as well as through speakers for audio, for example).

In some implementations, application 112 tracks data regarding user interactions, users, and/or player devices, and provides the data to an analytics server. Collected analytics can include, but are not limited to: the number, type, and/or location of a device; user data, such as login information, name, address, age, sex, and the like; user interactions, such as button/touchpad presses, mouse clicks, mouse/touchpad movements, interaction timings, and the like; decisions made by users or automatically (e.g., content segment user choices or default selections); and content paths followed in the presentation content structure. The analytics can include those described in U.S. patent application Ser. No. 13/034,645, entitled "System and Method for Data Mining within Interactive Multimedia," and filed Feb. 24, 2011, the entirety of which is incorporated by reference herein. In one instance, some or all of these analytics are included in or used to inform attributes in User Profile 210.

In one implementation, user profile information (e.g., information included in User Profile 210) includes one or more attributes. The attributes can include measured attributes that each have an associated value. Values can be fixed once determined, or can vary based on ongoing measurements or other tracking of user behavior, interactions, and other user-related information. Attributes can take the form of one or more types, and a particular user profile can include only one type of attribute, only two types of attributes, or more. In one example, a user profile includes two types of measured attributes: characteristic attributes and mood attributes. Characteristic attributes include information that defines a characteristic or property of a user, and can be represented, for example, by an alphanumeric value, binary or Boolean value (e.g., 1/0, yes/no) a value in a range that, at one end, indicates that the characteristic minimally represents the user and, at the opposite end, indicates that the characteristics maximally represents the user, or by other form of measurement. For example, a characteristic attribute can define a range from 0 to 100%, which is indicative of how much the user is considered to have a creative personality (0=user has no indications of a creative personality, 50%=neutral, 100%=user has very high indications of a creative personality). Characteristic attributes can include "Techie," "Foodie," "Creative," "Sports Fan," "Age," "Location," and/or any other attribute defining a user characteristic or property. Mood attributes include information that defines a mood of a user at a point in time (e.g., while the user is watching an interactive video). Mood attributes can operate similarly to characteristic attributes in their definition (e.g., alphanumeric value, Boolean value, range, etc.) Mood attributes can include states such as "Angry," "Hungry," "Frustrated," "Happy," "In-Love," and/or any other attribute defining a user's mood, feelings, or state of mind.

Figure 3:
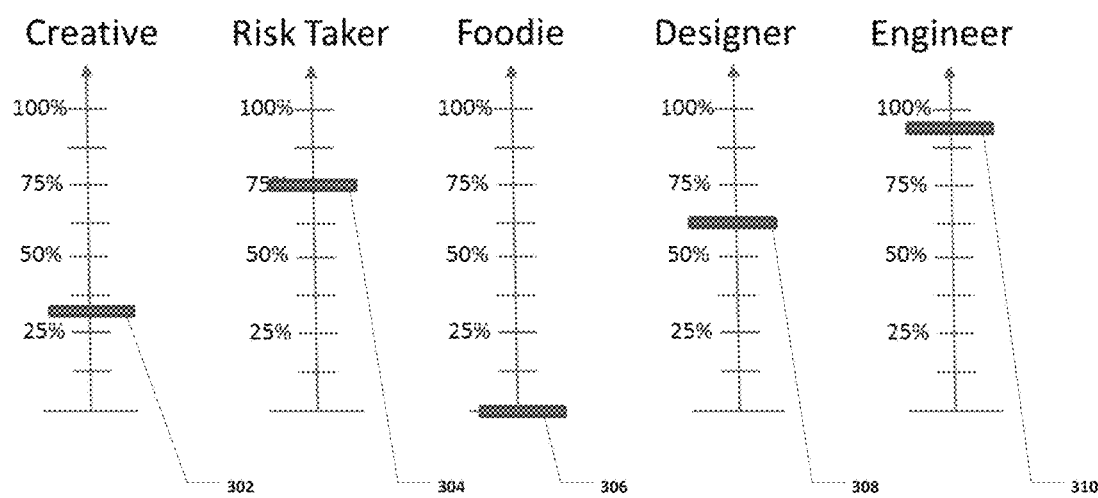
FIGS. 3 and 4 depict examples set of measured attributes respectively associated with user profiles.
Figure 4:
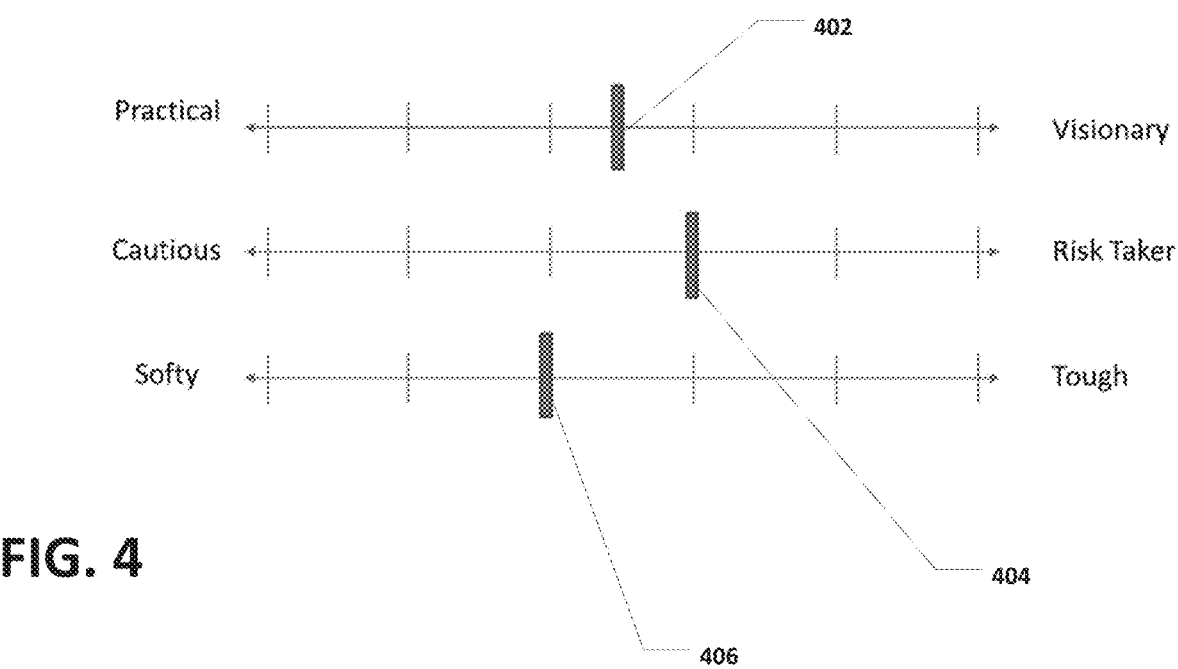
Figure 5:
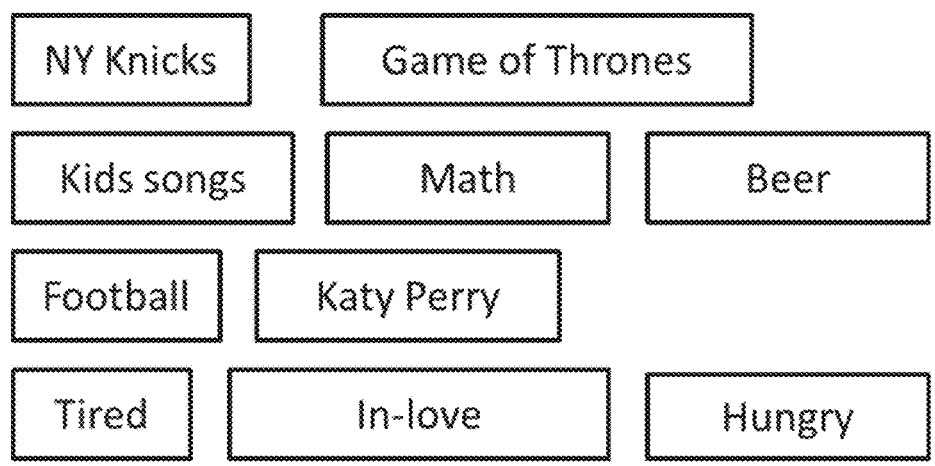
FIG. 5 depicts an example set of tags associated with a user profile.

Referring now to FIGS. 3-5, measured attributes can be represented in various manners. Such attributes can be hidden to a user or can be visually depicted and presented to a user during viewing of an interactive video presentation, and changes in the values of the attributes can be depicted in real-time as the user views the presentation and takes actions that affect the attributes. FIG. 3 depicts five measured characteristic attributes in a user profile: "Creative," "Risk Taker," "Foodie," "Designer," and "Engineer." Each attribute is represented by a numerical value in a range, specifically a percentage between 0 and 100%. FIG. 3 illustrates such visual depictions, with each of the five measured characteristic attributes shown as a sliding percentage scale, with a greater percentage value indicating that a particular attribute more strongly characterizes the user, and a lower percentage value indicating that a particular attribute more weakly characterizes the user. As shown, slider bar 302 indicates that the user is measured at just above 25% for the "Creative" characteristic, slider bar 304 indicates that the user is characterized at 75% "Risk Taker," slider bar 306 indicates that the user is not at all (0%) a "Foodie", slider bar 308 characterizes the user at approximately 62% "Designer," and slider bar 310 has the user strongly correlating (about 90%) to the "Engineer" characteristic.

Measured attributes can also be represented as a sliding scale between two or more different characteristics, moods, or otherwise. FIG. 4 depicts three such measured characteristic attributes: "Practical/Visionary," "Cautious/Risk Taker," and "Softy/Tough." Each attribute has a value that can vary between opposite ends of a spectrum. Taking the "Practical/Visionary" attribute as an example, slider bar 402 is precisely in the middle of the spectrum. In other words, the user associated with this attribute has exhibited no behaviors or characteristics that would tend to indicate the user would better be characterized as a practical-type person or a visionary-type person. With respect to the "Cautious/Risk Taker," slider bar 404 is closer to "Risk Taker" than it is to "Cautious." This can represent that the user has been identified as more of a risk taker than cautious. For example, if during an interactive video presentation the user is given a choice between having a character go skydiving or watch television, a choice of the former may bias the attribute towards "Risk Taker" and away from "Cautious." In a similar fashion, slider bar 406 characterizes a user who is more of a "Softy" than "Tough."

In some implementations, a "tag" can be used to represent an attribute of or information associated with a user. Tags can take many forms, as shown in FIG. 5, in which possible tags include "NY Knicks," "Math," and "Hungry." Tags applied to a user can be visible to the user, for example, while he or she is watching an interactive video, and can be updated visually in real-time as the user interacts and/or information known about the user changes. Rather than using a sliding scale or percentage of association, the existence of a tag can be binary; i.e., a tag is either applied to a user or not. As with the other ways that attributes can be represented, as described above, the application of tags can be affected based on information known about a user as well as actions taken by the user. For example, a tag indicating the used is "Tired" could be applied upon the user making multiple choices in an interactive video that favor dark, sleepy settings, or upon detecting that the user is exhibiting slow reaction times. The same tag could also be applied if it is determined that it is late at night where the user is located. Tags can be removed from association with a user in the same manner in which they are applied (e.g., based on user decisions and known information). Additionally, multiple tags can be added or removed from association with a user at the same time based on the same user actions and/or the same information associated with the user. For example, if a user chooses to watch a video segment about the television show, "Game of Thrones," instead of a video segment about the movie, "The Notebook," a tag referring to "Game of Thrones" and a tag referring to "Fantasy Genre" might both be applied to the user's profile, and a tag referring to "Romance" might be removed.

Attributes and, subsequently, a user profile can be updated in various manners. In one implementation, attributes are modified based on actions taken by a user during the presentation of an interactive video, such as interacting with content, selecting options, seeking to different parts of the video, making decisions that result in traversing different branches of a video tree, and so on. In some instances, one action can result in updating more than one attribute. Branching video presentations, such as those described herein, can have attribute updates associated with each possible decision that a user can make during the video (e.g., decisions that result in particular branches of the video being traversed as opposed to other branches). For example, each branch option can have associated metadata that specifies which attribute to update and how it should be updated when the branch option is selected.

Notably, a user profile can include attributes that are applicable to or otherwise have an effect on the presentation of only one interactive video, some interactive videos, or all interactive videos. For example, some mood attributes may be tracked only while the user is viewing an interactive video, in order to gauge the user's mood at that particular time, and will affect the presentation of only that interactive video (for example, using a technique described below). On the other hand, some characteristic attributes can be tracked and modified over one or more different videos, and can then affect how the presentation of those one or more different videos is dynamically modified, as described further below.

Figure 6:
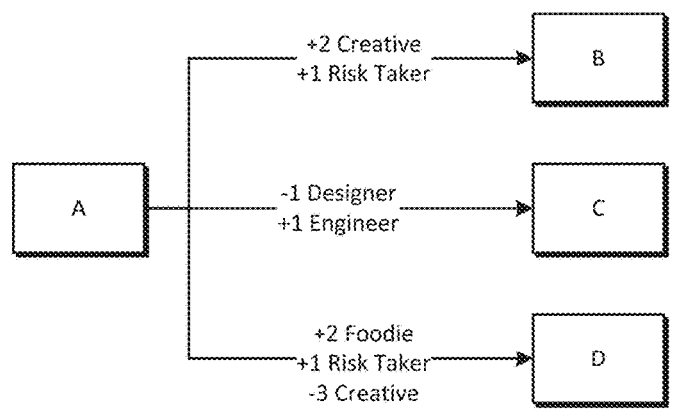
FIGS. 6-8 depict various examples of dynamically modifying the presentation of an interactive video based on user attributes.

FIG. 6 depicts an example interactive branching video, in which video segments B, C, and D are possible options branching from video segment A. During presentation of segment A, upon reaching a decision point, the user is presented with multiple options, each associated with a different branch B, C, or D. For example, the interactive video may involve the user making choices to guide a knight in defeating a dragon and saving a princess. Depending on the choices made by the user, the video may proceed down the path having segment B, C, or D, following segment A. Further, depending on the user's decision (which path is taken), measured attributes associated with the user can be updated. Using the example of the knight, upon approaching the dragon, the user may be presented with three options: (1) try to put the dragon to sleep by playing a song, (2) construct a catapult to hurl a stone at the dragon, or (3) bring a large pizza up to the dragon. If the user selects option 1, the video proceeds from segment A to segment B, and the user is characterized as having made a very creative but risky choice. Consequently, the value of the user's "Creative" attribute is increased by two, and that of the "Risk Taker" attribute is increased by one. Similarly, by selecting option 2, the video proceeds from segment A to segment C, and the user is characterized as being more of an engineer and less of a designer. Thus, the "Designer" attribute is decreased by one, while the "Engineer" attribute is increased by one. Finally, if the user brings the dragon a pizza (option 3), segment C follows segment A, and the user is characterized as more of a "Foodie" (+2) and a "Risk Taker" (+1), but not as a "Creative" (−3).

Figure 7:
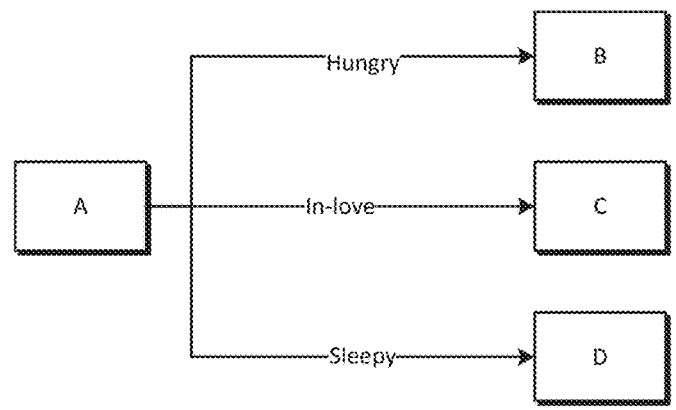

Based on or more attributes associated with a user viewing an interactive video, dynamic modifications can be made to how the video is presented to the user. For example, rather than giving a user options on how to proceed at a decision point, the system can automatically select a choice (and subsequent video segment to be played) based on attributes in the user's profile. FIG. 7 depicts one such example, in which the path to traversed in the interactive video following video segment A depends on which attribute is most strongly correlated with the user (e.g., which attribute has the highest value). If, for instance, the mood attribute, "In-love" has the highest value among the "Hungry", "In-love", and "Sleepy" attributes, then video segment C is automatically chosen as the next segment to be played following segment A. Likewise, segment B is chosen if the user is more "Hungry", and segment D is automatically chosen if the user is more "Sleepy". In other implementations, the user is provided with choices at a decision point, but after a certain amount of time (e.g., a timeout period), an automatic selection can be made on behalf of the user based on one or more of the attributes.

Figure 8:
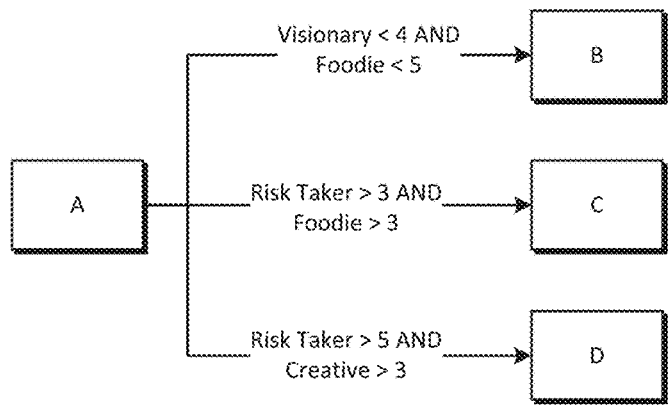

As another example, attributes in the user's profile can affect which choices are provided to the user. For example, a decision point in an interactive video may have by default five possible options that are presented to a user, but only a subset of these options are made available when certain conditions are met with respect to the user's attributes. FIG. 8 depicts an example decision point in an interactive video, where up to three options are presented to the user, each having a corresponding video segment B, C, or D that follows video segment A if that option is selected. The decision point can occur at any time or during any time period in video segment A, including at its conclusion. The transition from video segment A to a subsequent segment B, C, or D can occur immediately upon a selection of an option, or, after an option is selected by the user or automatically, after a delay or at the conclusion of segment A. As depicted, each option and corresponding possible branching path that a user can take (i.e., from video segment A to video segment B, C, or D) has an associated logic statement that defines when that option will be presented to a user. For instance, the option associated with video segment B will be shown for the decision point when the user's "Visionary" attribute has a value less than 4 and the user's "Foodie" attribute has a value less than 5. Likewise, the option associated with video segment C is presented when both the "Risk taker" and the "Foodie" attribute values exceed 3, and the option associated with segment D is shown when the "Risk taker" attribute value is greater than 5 and the "Creative" attribute value is greater than 3. Advantageously, various forms of logic and other operations can be associated with a particular option, video segment, or branch. This can include, for example, Boolean operators (e.g., to identify whether the user's profile includes a particular attribute or tag), mathematical operators (e.g., attribute value=5, attribute value>10, etc.), logical operators (e.g., AND, OR, NOT, XOR, etc.), and any other technique for evaluating attributes individually and/or in combination.

Referring still to FIG. 8, different user profiles having attributes of different values can result in different options being presented to a particular user. Consider, for example, a user having the following user profile:

Visionary=3; Foodie=4; Risk Taker=4; Creative=6

Using these attributes and values in the user profile, the logic associated with each option is evaluated in order to determine whether to display the option. Because the "Visionary" attribute value is less than 4 and the "Foodie" attribute value is less than 5, the option corresponding to video segment B will be presented to the user during the interactive video. The option corresponding to video segment C is also presented, given that the values for both the "Risk Taker" and "Foodie" attributes exceeds 3. However, the video segment D option is not presented, because, although the "Creative" attribute value is greater than 3, the "Risk Taker" attribute is 4 (does not exceed 5). Accordingly, the logic evaluates to false, and option D is not made available to the user. Ultimately, given this user profile, the user is given the option to choose video segment B or C following playback of at least a portion of video segment A.

Another example profile is as follows:

Visionary=3; Foodie=6; Risk Taker=7; Creative=6

Performing the same analysis as above, but applied to these user attribute values, the resulting options made available to the user correspond to video segments C and D only. The option associated with video segment B is not made available, because, although the "Visionary" attribute value is less than 4, the "Foodie" value equals 6, which is not less than 5. A third user profile, resulting in all three options (respectively corresponding to video segments B, C, and D) being made available to the user, is as follows:

Visionary=3; Foodie=4; Risk Taker=7; Creative=6

In other words, when applying the logic corresponding to each of these three options against the attribute values of the third user profile, each logic statement evaluates to a "true" condition, causing that option to be shown to the user.

In some implementations, a user profile includes attribute values that cause only one of the logic statements to evaluate to true. For example, the following user profile:

Visionary=3; Foodie=4; Risk Taker=7; Creative=6 results in the logical statement associated with the video segment B path to evaluate to true (and, therefore, for the option associated with that segment to be made available to the user). However, these attribute values do not satisfy the logic associated with the video segment C and D options, which are consequently not shown to the user. When only one option is available based on a user profile, as in this case, the user can be presented with and permitted to select the option by itself. Alternatively, the interactive video can select the path associated with that option automatically, either immediately or after a period of time, with or without letting the user see a depiction of the option. In the instance where the logic statements associated with all of the options evaluate to false, several actions are possible. For example, one option can be designated as a default option that is presented for selection to the user, or automatically selected, when no options evaluate positively based on the current user's profile. As another option for this situation, a random option can be presented or automatically selected. In another implementation, where all options evaluate to false, the interactive video jumps to another segment not related to any of the options, or simply ends.

As described above, mood attributes associated with a user can change dynamically while a video is played for the user. This allows for different videos to be shown, different paths in an interactive video to be followed, and so on, based on the current mood or emotional state of the user. In some implementations, one or more factors can affect a user's mood attributes. For example, the content of video or other media presented to the user can result in a change in one or more mood attributes. In one example, a "scared" mood attribute is tracked for a user. Upon presenting a video containing a frightening scene, the user is assumed to be more frightened than prior to the scene being played, and so the user's "scared" attribute is increased in number (e.g., +1, +2, or more) or otherwise amplified (e.g., from low to medium). In another example, a video scene includes calming background music, resulting in the "scared" attribute being reduced in intensity and a "calm" attribute consequently increasing. Mood attributes can also be modified based the actions of a user, such as the choices the user makes during playback of an interactive video. For instance, the user's character in an interactive video may encounter a cookie-eating monster and be provided the option of fighting or fleeing. If the user chooses to fight, the user's mood profile will become more reflective of an aggressive emotional state, whereas, if the user chooses to flee, the mood profile will tend towards a less aggressive state.

Figure 9:
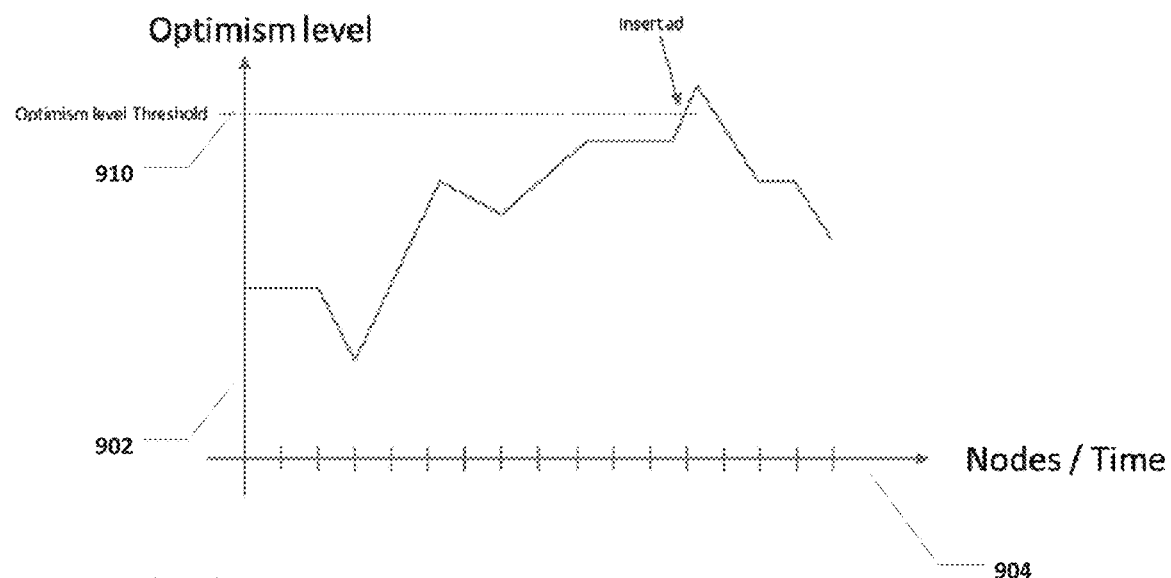
FIGS. 9-12 depict various examples of changes in user mood or emotional state over time and actions taken based on the changes.

Advantageously, changes in the mood or emotional state of a user, as measured using mood attributes, can be used to dynamically affect a video presentation in progress. As one example, FIG. 9 depicts a user's measured level of optimism (axis 902) over a period of time, such as the duration of a media presentation, or the number of nodes or video segments played in an interactive video (axis 904). During presentation of the video, the user can make various decisions to progress through different branches of a story. Each decision can be characterized as optimistic, pessimistic, or neutral. If the user makes a decision that is characterized as optimistic, his optimism level (attribute) increases. If, on the other hand, a pessimistic choice is made, the user's optimism level decreases. A neutral decision results in no change to the optimism attribute. The optimism level can also change based on the type of content the user views (e.g., highly-positive content will result in a large increase to the optimism level). Client-side code (e.g., a browser or native video player) or server-side code can track the optimism level and determine when an event occurs, such as when optimism level threshold 910 is reached. Upon reaching the threshold 910, an action can be taken, immediately or after some period of time. The action can be, for example, presenting particular media content (e.g., an advertisement) to the user, jumping to a different point in the video presentation, changing available options at decision points in an interactive video, and so on.

A threshold value for a particular attribute, such as the optimism level, can be any value within the range of the maximum and minimum attribute values. Generally, the threshold is chosen to be representative of a particular point at which an action should be taken. For example, if the possible values of optimism range from 0 to 100, the threshold at which an optimistic advertisement will be shown can be set at 80. In some implementations, more than one threshold for a particular attribute can be defined. For example, a somewhat optimistic advertisement can be shown to the user if his optimism level reaches 60, and a highly optimistic advertisement can be shown if the optimism level reaches 90. In one implementation, an action is taken if the threshold is met or exceeded by an attribute value. In another implementation, an action is taken if the attribute value is greater than or equal to a threshold, and then drops below such threshold. In some instances, an action can be taken if no threshold is reached after a period of time (e.g., 30 seconds, 2 minutes, a percentage of the total playback time, etc.).

Figure 10:
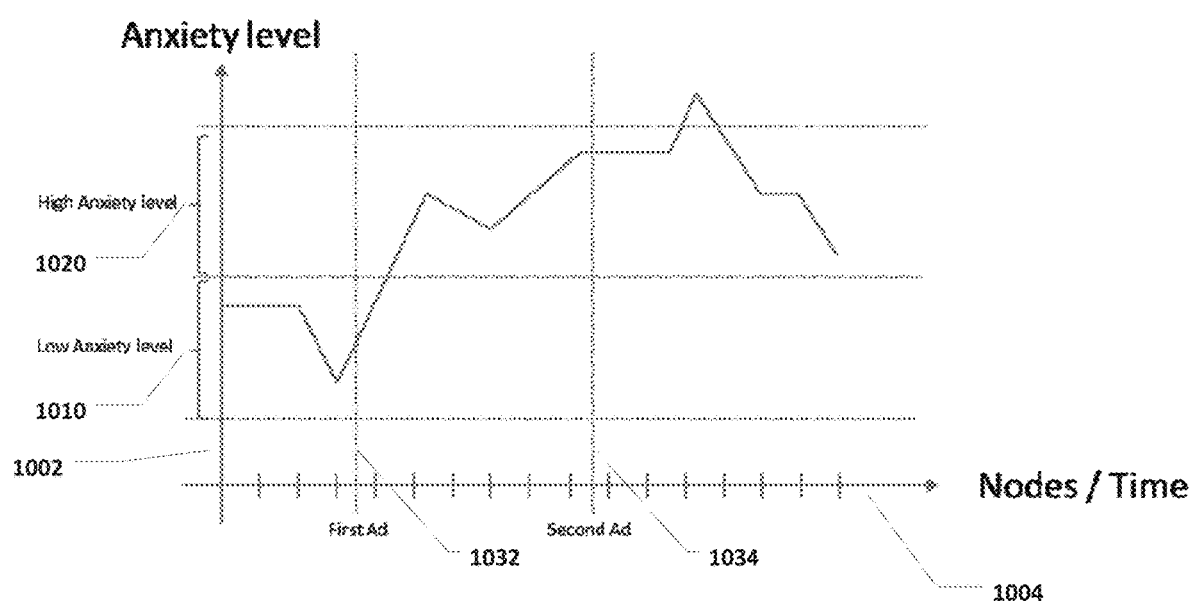

FIG. 10 illustrates a user's measured level of anxiety (axis 1002) over a period of time, such as the duration of a media presentation, or the number of nodes or video segments played in an interactive video (axis 1004). As with the example in FIG. 9, measured attributes characterizing the user's mood or emotional state (here, anxiety level) can change over time based on content presented to the user and/or actions taken by the user with respect to the content, such as decisions made in an interactive video. Ranges 1010, 1020 define different ranges of anxiety level, with range 1010 defining a low anxiety level range, and range 1020 defining a high anxiety level range. Two ranges 1010, 1020 are shown in FIG. 10; however, any number of ranges (e.g., one, two, three, etc.) can be defined. Ranges can be consecutive, non-consecutive, or overlapping. One or more ranges can cover an entire possible range of a mood or emotional state (e.g., 0 to 100); however, it is not required that they do so. For example, as shown in FIG. 10, the user's anxiety level can rise above the maximum value of range 1020. Here, range 1010 defines a low anxiety level (e.g., 20 to 50 out of a total possible range of 0 to 100), and range 1020 defines a high anxiety level (e.g., 51 to 80 out of a total possible range of 0 to 100). At any point in time during the presentation of media content, the user's tracked anxiety level can be evaluated, and an action can be taken if the anxiety level falls within (or doesn't fall within) one of the defined ranges 1010, 1020. In the depicted example, the user's anxiety level is queried at two separate times in order to determine which version of an advertisement will be shown to the user at the corresponding time slot. At the first ad break 1032, the user's anxiety level falls within the lower anxiety level range 1010, and so a standard version of an advertisement is played, instead of a relaxed version. However, by the time the second ad break 1034 is reached, the user's anxiety level has risen and is now within the high anxiety level range 1020. As a result, a more relaxed version of an advertisement is played at the second ad break 1034, as opposed to a standard version. The relaxed version may include, for example, calmer music, a slower pace, and fewer action-oriented scenes.

Figure 11:
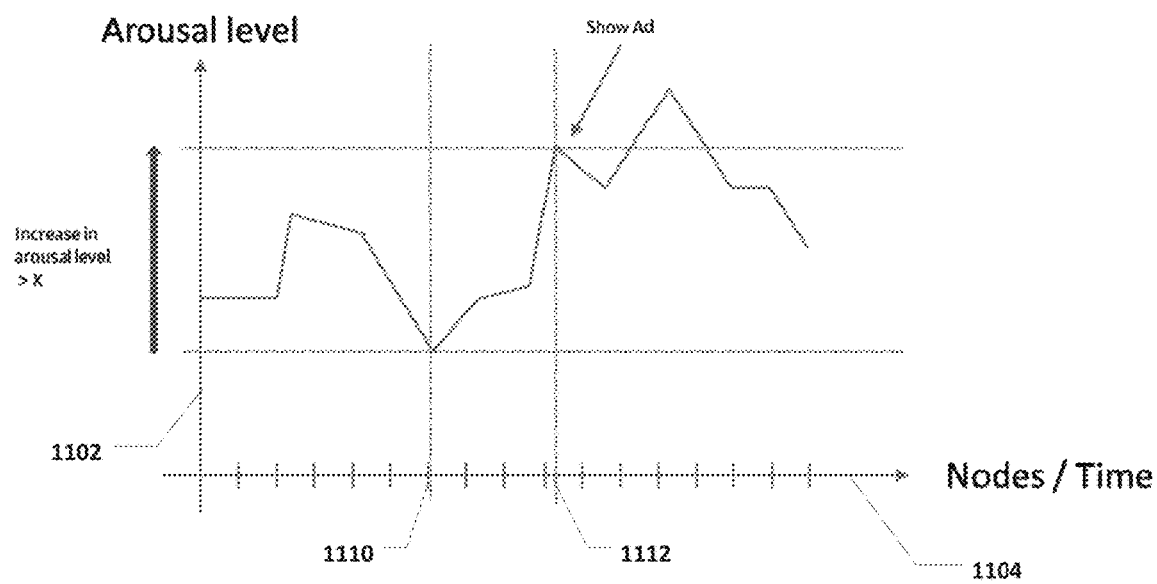

FIG. 11 illustrates a user's measured level of arousal (axis 1102), such as perceptiveness or excitement, over a period of time, such as the duration of a media presentation, or the number of nodes or video segments played in an interactive video (axis 1104). Measured attributes characterizing the user's mood or emotional state (here, arousal) can change over time based on content presented to the user and/or actions taken by the user with respect to the content, such as decisions made in an interactive video. Certain events can be detected while the user's mood or emotional state is being tracked, such as a change in the mood or emotional state that meets a threshold value or a deviation from an average mood or emotional state. For example, an action (e.g., showing an advertisement) can be taken on detecting that the user's arousal level has increased by a particular amount (e.g., greater or equal to a specific value, greater or equal to a percentage, etc.). As shown in FIG. 11, an advertisement is shown when the user experiences an increase in arousal level greater than value X, between time 1110 and time 1112. Similarly, detected events can include any type of change in a mood or emotional state, such as a decrease of a particular amount, a deviation from an average mood or emotional state, and so on. In the case of identifying a deviation from average, the user's average mood or emotional state can be determined based on, for example, the average value of mood or emotional state during playback of other videos, the average value of mood or emotional state during previous playbacks of the currently playing video, and/or the average value of mood or emotional state during a particular time period (e.g., from the beginning, moving time window, etc.) in the currently playing video.

Figure 12:
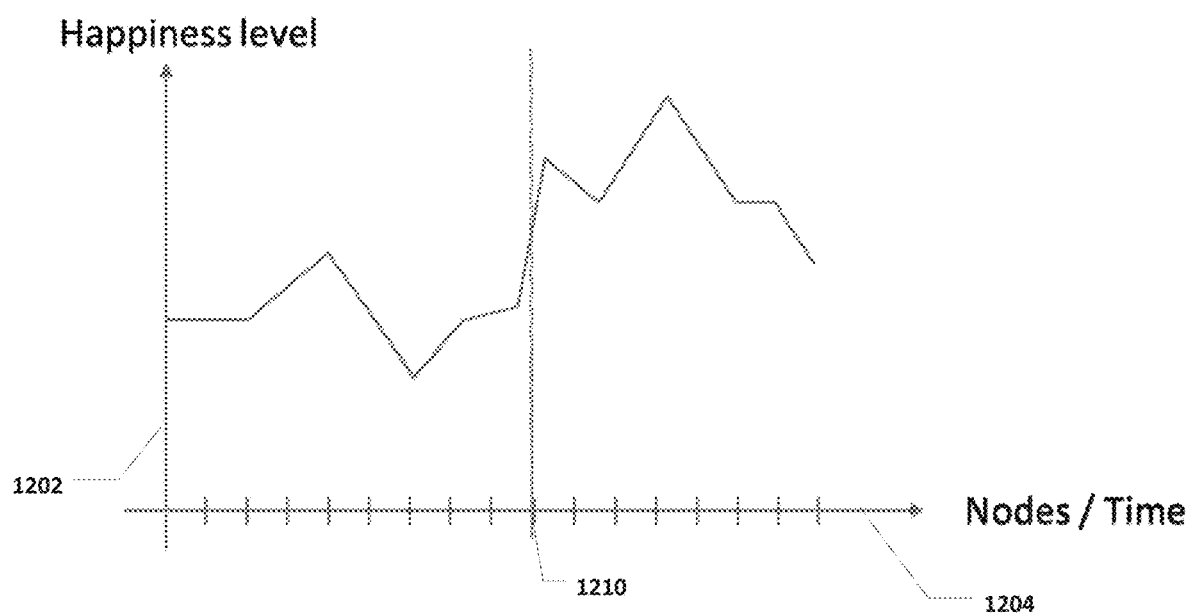

FIG. 12 illustrates a user's measured level of happiness (axis 1202) over a period of time, such as the duration of a media presentation, or the number of nodes or video segments played in an interactive video (axis 1204). Measured attributes characterizing the user's mood or emotional state (here, happiness) can change over time based on content presented to the user and/or actions taken by the user with respect to the content, such as decisions made in an interactive video. An action can be taken upon identifying an event comprising a trend or tendency in the user's mood or emotional state. For example, in FIG. 12, upon identifying that the user's happiness level is rising, an advertisement is shown at time 1210.

One will appreciate that the dynamic modification of an interactive video based on attributes (e.g., automatic path selections, availability of options to a user, etc.) can take into account various properties of the attributes, which can include, in addition to those described above, highest value of attribute or a combination of attributes, lowest value of an attribute or a combination of attributes, existence of one or more attributes in a user's profile, whether one or more attribute values meets (or is less than or exceeds) a particular value or falls into one or more specified ranges, attribute type (e.g., mood, characteristic, tag, etc.), combinations of the foregoing, and so on.

Use cases for the present technology are virtually limitless. The following constitute just a few examples of the many ways in which the disclosed techniques can be implemented. One application is to select an advertisement to be played before, during, and/or after an interactive video based on a user's profile and the attributes therein. If, for example, the user watching the video has, according to the attributes in her profile, expensive taste and her current mood is "in-love", then a jewelry advertisement may be shown. If, on the other hand, the user's mood is "hungry", an ad can be shown for a Michelin star restaurant. Another use case is adapting the presentation of an interactive video when a particular attribute strongly corresponds to the user. For example, if a user continually makes choices in the interactive video that increase or maximize the value associated with one or more technology-type attributes, the video can emphasize technology-related choices or content. The video can, for example, highlight choices for the user that are technology-related, automatically play technology-related video segments, present technology-related advertisements, and so on. In another implementation, special content can be shown for users having attributes that meet particular requirements or reach a threshold. For example, an attribute can track the number of answers correctly answered in an interactive video quiz, and a behind-the-scenes video can be shown only to users who answer at least 90% of the quiz questions correctly.

In another use case, a series of episodes includes multiple interactive videos. In the first episode, the various choices made by the user in traversing the video results in the creation of a profile with various measured attributes. In subsequent episodes, the video can be dynamically modified based on the profile. For example, if the user reacted in a manner that raised his "Fear" attribute in the first episode, later episodes can show alternative video segments with less frightening content. In yet another implementation, the present techniques can be used to provide parental controls over which content is shown. For example, if a user's profile indicates that the user is 13-16 years of age, only video segments that are rated PG-13 or lower are displayed.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. For example, one of skill in the art will appreciate that the techniques for creating seamless audio segments can be applied to creating seamless video segments and other forms of seamless media as well. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
receiving a first video tree representing a first interactive video, the first video tree defining a plurality of branches in the first interactive video, each branch comprising one or more video segments;
tracking information comprising at least one of (i) content of video segments played during presentation of the first interactive video and (ii) decisions of a user made during the presentation of the first interactive video, the decisions being associated with a plurality of branching points in the first interactive video;
generating a profile for the user based at least in part on the tracked information, wherein the profile comprises a plurality of measured attributes having respective values relating to the user, wherein a first one of the measured attributes is a characteristic attribute defining a characteristic of the user, wherein a second one of the measured attributes is a mood-emotion attribute defining a mood or emotional state of the user, and wherein tracking the information comprises determining a value of a particular one of the measured attributes at a plurality of different times during presentation of the first interactive video, the plurality of different times comprising times during presentation of content of different video segments in the first interactive video and/or times of the user making decisions at different branching points in the first interactive video;
receiving a second video tree representing a second interactive video, the second video tree defining a plurality of branches in the second interactive video, each branch comprising one or more video segments; and
dynamically modifying presentation of the second interactive video based at least in part on the profile, wherein dynamically modifying presentation of the second interactive video comprises:
identifying a branching point in the second video tree, wherein a plurality of branches source from the identified branching point, wherein each branch sourcing from the identified branching point has an associated logic statement corresponding to a plurality of conditions associated with the one or more video segments of the branch, wherein the logic statement for each branch includes at least two thresholds that determine whether at least two different measured attributes satisfy the plurality of conditions;
evaluating, for each branch sourcing from the identified branching point, whether the plurality of conditions of the logic statement associated with the one or more video segments of the branch are satisfied by comparing the at least two thresholds to the respective values of the at least two different measured attributes relating to the user prior to selecting the one or more video segments of the branch for presentation to the user;
selecting a subset of the branches sourcing from the identified branching point, wherein a branch is selected for inclusion in the subset based on the plurality of conditions of the logic statement associated with the one or more video segments of the branch being satisfied by the respective values of the at least two different measured attributes relating to the user; and
during presentation of the second interactive video, upon the user reaching the identified branching point, providing to the user one or more options that correspond with the selected subset of branches, and not providing to the user options that correspond with branches sourcing from the identified branching point that are not included in the selected subset of branches.

2. The method of claim 1, wherein the presentation of the second interactive video comprises a presentation of the first interactive video at a later time.

3. The method of claim 1, wherein each branch of a plurality of branches sourcing from a first one of the branching points in the first interactive video has associated at least one attribute modifier, wherein each attribute modifier defines how a value of one of the measured attributes is modified upon the branch being selected during playback of the first interactive video.

4. The method of claim 3, wherein generating the profile comprises:
   determining that a particular tracked decision of the user resulted in a selection of a first one of the branches sourcing from the first branching point; and
   increasing or decreasing a value of at least one of the measured attributes based on the at least one attribute modifier associated with the first one of the branches.

5. The method of claim 1, wherein generating the profile comprises associating or disassociating one or more tags with the user based on one of the tracked decisions.

6. The method of claim 1, wherein the profile is generated further based on known data regarding the user, the known data comprising a location, a demographic attribute, or a social media account name.

7. The method of claim 1, wherein one or more of the measured attributes has a predetermined range of values, and wherein the range has an upper bound value indicating that a user is maximally associated with the attribute and a lower bound value indicating that a user is minimally associated with the attribute.

8. The method of claim 1, wherein an initial value of each measured attribute comprises a neutral value.

9. The method of claim 1, wherein dynamically modifying presentation of the second interactive video further comprises:
   during presentation of the second interactive video, upon the user reaching the identified branching point, automatically selecting one of the branches included in the selected subset of branches.

10. A system comprising:
    at least one memory for storing computer-executable instructions; and
    at least one processor for executing the instructions stored on the memory, wherein execution of the instructions programs the at least one processor to perform operations comprising:
       receiving a first video tree representing a first interactive video, the first video tree defining a plurality of branches in the first interactive video, each branch comprising one or more video segments;
       tracking information comprising at least one of (i) content of video segments played during presentation of the first interactive video and (ii) decisions of a user made during the presentation of the first interactive video, the decisions being associated with a plurality of branching points in the first interactive video;
       generating a profile for the user based at least in part on the tracked information, wherein the profile comprises a plurality of measured attributes having respective values relating to the user, wherein a first one of the measured attributes is a characteristic attribute defining a characteristic of the user, wherein a second one of the measured attributes is a mood-emotion attribute defining a mood or emotional state of the user, and wherein tracking the information comprises determining a value of a particular one of the measured attributes at a plurality of different times during presentation of the first interactive video, the plurality of different times comprising times during presentation of content of different video segments in the first interactive video and/or times of the user making decisions at different branching points in the first interactive video;
       receiving a second video tree representing a second interactive video, the second video tree defining a plurality of branches in the second interactive video, each branch comprising one or more video segments; and
       dynamically modifying presentation of the second interactive video based at least in part on the profile, wherein dynamically modifying presentation of the second interactive video comprises:
          identifying a branching point in the second video tree, wherein a plurality of branches source from the identified branching point, wherein each branch sourcing from the identified branching point has an associated logic statement corresponding to a plurality of conditions associated with the one or more video segments of the branch, wherein the logic statement for each branch includes at least two thresholds that determine whether at least two different measured attributes satisfy the plurality of conditions;
          evaluating, for each branch sourcing from the identified branching point, whether the plurality of conditions of the logic statement associated with the one or more video segments of the branch are satisfied by comparing the at least two thresholds to the respective values of the at least two different measured attributes relating to the user prior to selecting the one or more video segments of the branch for presentation to the user;
          selecting a subset of the branches sourcing from the identified branching point, wherein a branch is selected for inclusion in the subset based on the plurality of conditions of the logic statement associated with the one or more video segments of the branch being satisfied by the respective values of the at least two different measured attributes relating to the user; and
          during presentation of the second interactive video, upon the user reaching the identified branching point, providing to the user one or more options that correspond with the selected subset of branches, and not providing to the user options that correspond with branches sourcing from the identified branching point that are not included in the selected subset of branches.

11. The system of claim 10, wherein the presentation of the second interactive video comprises a presentation of the first interactive video at a later time.

12. The system of claim 10, wherein each branch of a plurality of branches sourcing from a first one of the branching points in the first interactive video has associated at least one attribute modifier, wherein each attribute modifier defines how a value of one of the measured attributes is modified upon the branch being selected during playback of the first interactive video.

13. The system of claim 12, wherein generating the profile comprises:
    determining that a particular tracked decision of the user resulted in a selection of a first one of the branches sourcing from the first branching point; and increasing or decreasing a value of at least one of the measured attributes based on the at least one attribute modifier associated with the first one of the branches.

14. The system of claim 10, wherein dynamically modifying presentation of the second interactive video further comprises:
during presentation of the second interactive video, upon the user reaching the identified branching point, automatically selecting one of the branches included in the selected subset of branches.

15. A computer-implemented method comprising:
receiving a video tree representing an interactive video, the video tree defining a plurality of branches in the interactive video, each branch comprising one or more video segments;
tracking information comprising at least one of (i) content of video segments played during presentation of the interactive video and/or videos previously played to a user and (ii) decisions of the user made during the presentation of the interactive video and/or the videos previously played to the user;
generating a profile for the user based at least in part on the tracked information, wherein the profile comprises one or more measured attributes having respective values relating to the user, wherein a first one of the measured attributes is a mood-emotion attribute defining a mood or emotional state of the user, wherein a second one of the measured attributes is a characteristic attribute defining a characteristic of the user, and wherein the mood-emotion attribute comprises a plurality of predetermined ranges of values, each range of values defining a different level of a single mood or emotional state associated with the first measured attribute, and wherein generating the profile comprises:
identifying the occurrence of at least one of (i) played video content associated with a particular mood or emotional state and (ii) a decision of the user made within an interactive video and associated with the particular mood or emotional state; and
dynamically modifying the presentation of the interactive video upon determining that a mood or emotional state event has occurred based at least in part on the measured attributes in the user profile, wherein determining that a mood or emotional state event has occurred comprises determining that a value of the mood-emotion attribute falls within a particular one of the predetermined ranges of values, and wherein dynamically modifying the presentation further comprises:
identifying a branching point in the video tree, wherein a plurality of branches source from the identified branching point, wherein each branch sourcing from the identified branching point has an associated logic statement corresponding to a plurality of conditions associated with the one or more video segments of the branch, wherein the logic statement for each branch includes at least two thresholds that determine whether at least two different measured attributes satisfy the plurality of conditions;
evaluating, for each branch sourcing from the identified branching point, whether the plurality of conditions of the logic statement associated with the one or more video segments of the branch are satisfied by comparing the at least two thresholds to the respective values of the at least two different measured attributes relating to the user prior to selecting the one or more video segments of the branch for presentation to the user;
selecting a subset of the branches sourcing from the identified branching point, wherein a branch is selected for inclusion in the subset based on the plurality of conditions of the logic statement associated with the one or more video segments of the branch being satisfied by the respective values of the at least two different measured attributes relating to the user; and
during presentation of the interactive video, upon the user reaching the identified branching point, providing to the user one or more options that correspond with the selected subset of branches, and not providing to the user options that correspond with branches sourcing from the identified branching point that are not included in the selected subset of branches.

16. The method of claim 15, wherein dynamically modifying the presentation of the interactive video upon determining that a mood or emotional state event has occurred further includes determining that one or more of the measured attributes has reached a respective mood or emotional state threshold, and, in response thereto: (i) selecting video content based on which mood or emotional state thresholds have been reached by the one or more measured attributes; and (ii) presenting the selected video content to the user.

17. The method of claim 15, wherein dynamically modifying the presentation of the interactive video upon determining that a mood or emotional state event has occurred further includes determining that one or more of the measured attributes falls within a respective mood or emotional state range, and, in response thereto: (i) selecting video content based on which mood or emotional state ranges include the one or more measured attributes; and (ii) presenting the selected video content to the user.

18. The method of claim 15, wherein dynamically modifying the presentation of the interactive video upon determining that a mood or emotional state event has occurred further includes determining that a change in one or more of the measured attributes exceeds a threshold, and, in response thereto: (i) selecting video content based on which of the one or more measured attributes has a change that exceeds the threshold; and (ii) presenting the selected video content to the user.

19. The method of claim 15, wherein dynamically modifying the presentation of the interactive video upon determining that a mood or emotional state event has occurred further includes determining that one or more of the measured attributes exhibits a trend, and, in response thereto: (i) selecting video content based on which of the one or more measured attributes exhibits the trend; and (ii) presenting the selected video content to the user.

* * * * *